United States Patent [19]

Oslin

[11] Patent Number: 5,640,946

[45] Date of Patent: *Jun. 24, 1997

[54] STEAMER APPARATUS

[76] Inventor: G. Robert Oslin, 3300 N. Lake Shore Dr. Apartment 6A, Chicago, Ill. 60657

[*] Notice: The term of this patent shall not extend beyond the expiration date of Pat. No. 5,368,008.

[21] Appl. No.: 408,562

[22] Filed: Mar. 22, 1995

Related U.S. Application Data

[60] Continuation of Ser. No. 344,233, Nov. 23, 1994, abandoned, which is a division of Ser. No. 958,880, Oct. 9, 1992, Pat. No. 5,368,008.

[51] Int. Cl.$^6$ ...................................................... A21B 1/08
[52] U.S. Cl. .......................... 126/20; 126/20.1; 126/369; 126/369.2
[58] Field of Search ........................ 126/20, 20.1, 20.2, 126/348, 369, 369.2, 369.3; 122/16, 17, 44.2, 135.3, 149

[56] References Cited

U.S. PATENT DOCUMENTS

| | | |
|---|---|---|
| 4,011,805 | 3/1977 | Vegh et al. . |
| 4,173,215 | 11/1979 | Bureau et al. . |
| 4,281,636 | 8/1981 | Vegh et al. . |
| 4,506,598 | 3/1985 | Meister . |
| 4,552,123 | 11/1985 | Birkner et al. . |
| 4,641,630 | 2/1987 | Meister . |
| 4,655,192 | 4/1987 | Jovanovic . |
| 4,700,685 | 10/1987 | Miller . |
| 4,817,582 | 4/1989 | Oslin et al. . |
| 4,823,766 | 4/1989 | Violi . |
| 4,924,072 | 5/1990 | Oslin . |
| 5,014,679 | 5/1991 | Childs et al. . |

Primary Examiner—Carroll B. Dority

[57] ABSTRACT

Atmospheric convection type steamer apparatus includes at least one oven chamber and a discrete atmospheric steam generator operative to provide steam to the even chamber. A quiescent low fire power input to the steam generator maintains water in the steam generator at its boiling temperature during a non-cooking mode and provides a continuous steam flow into the oven chamber to maintain the chamber in a ready condition for substantially instantaneous steam heating when a cooking or high fire mode is initiated. In a stacked double oven embodiment, each oven chamber has a discrete atmospheric steam generator maintained at a quiescent low fire power input sufficient to maintain the water at its boiling temperature and effect a continuous ready condition within the corresponding oven chambers. Steam lines directly connect the oven chambers to their corresponding steam generators and enable introduction of cleaning and deliming agents directly into the steam generators from within the oven chambers. Other features contribute to improved steamer operation, reliability and cost savings over prior atmospheric steamers.

12 Claims, 11 Drawing Sheets

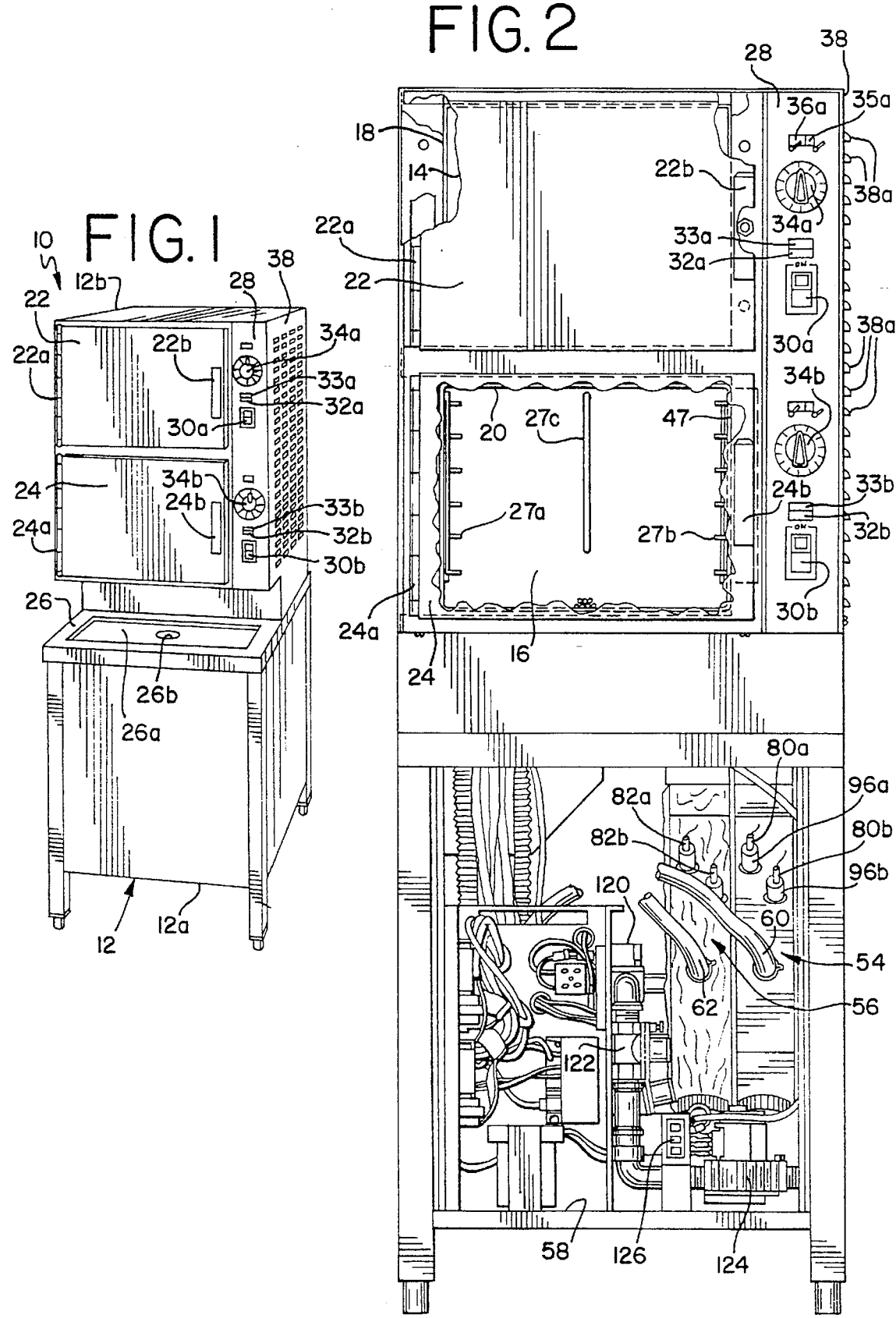

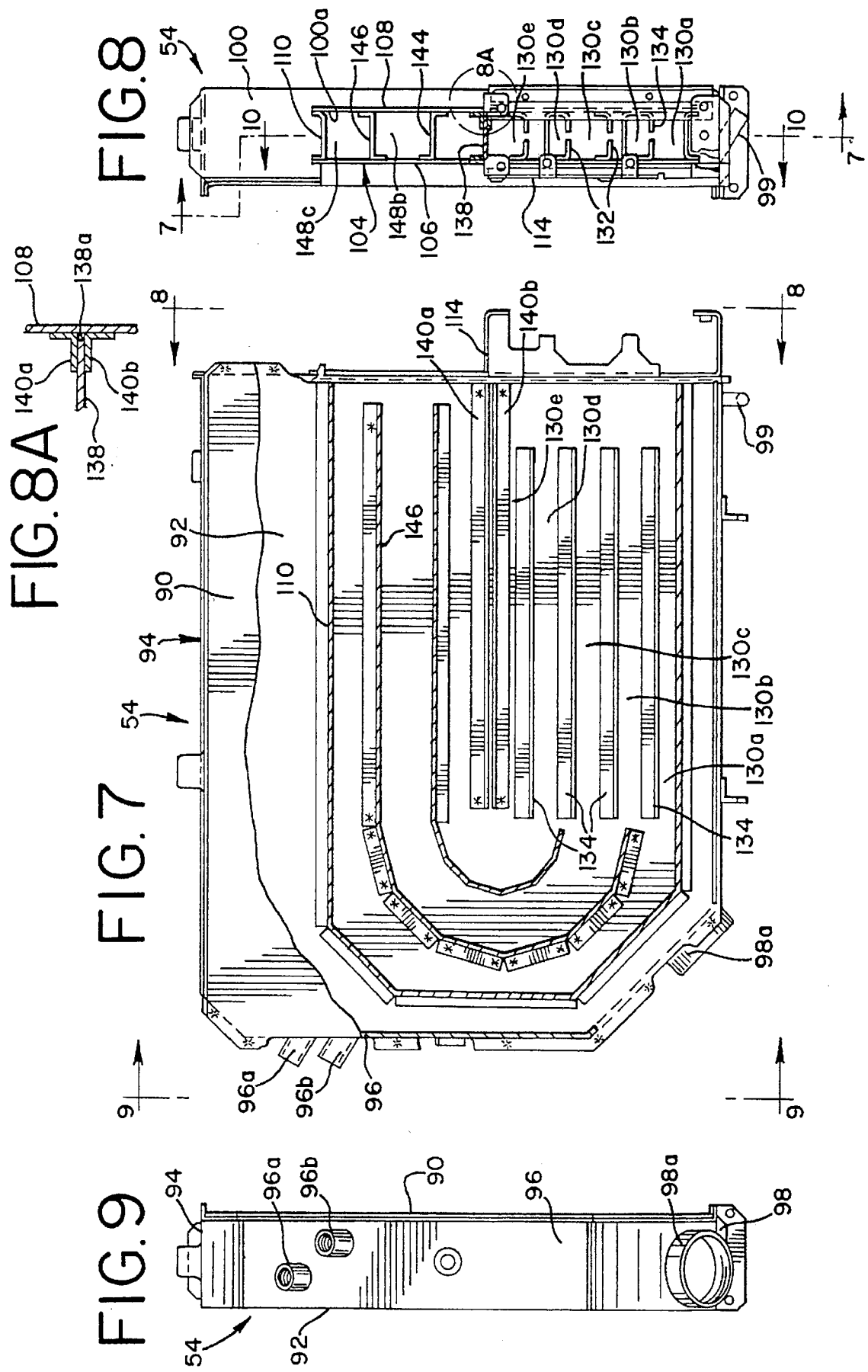

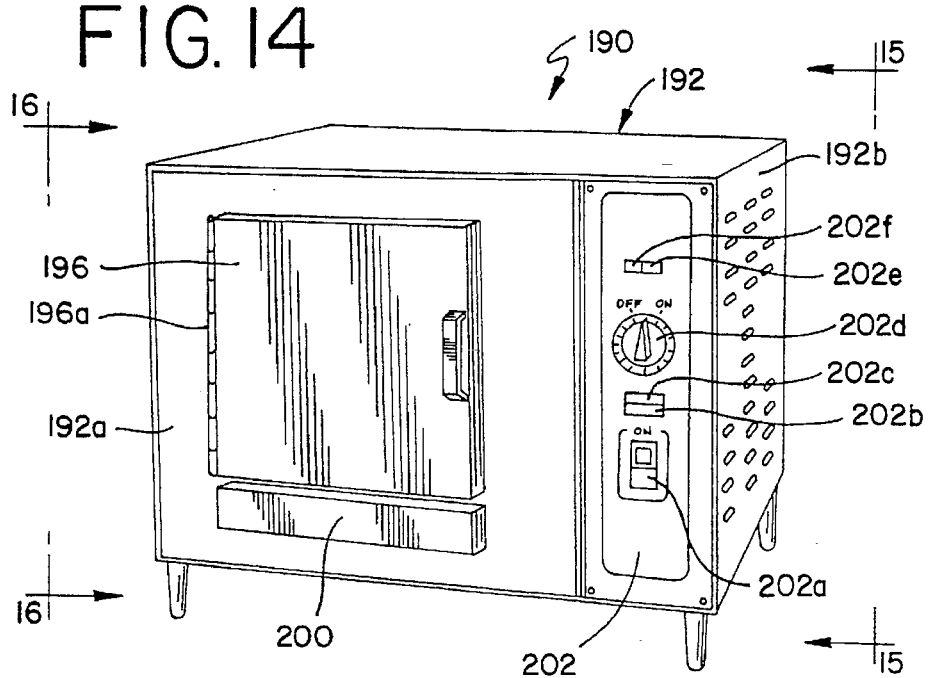
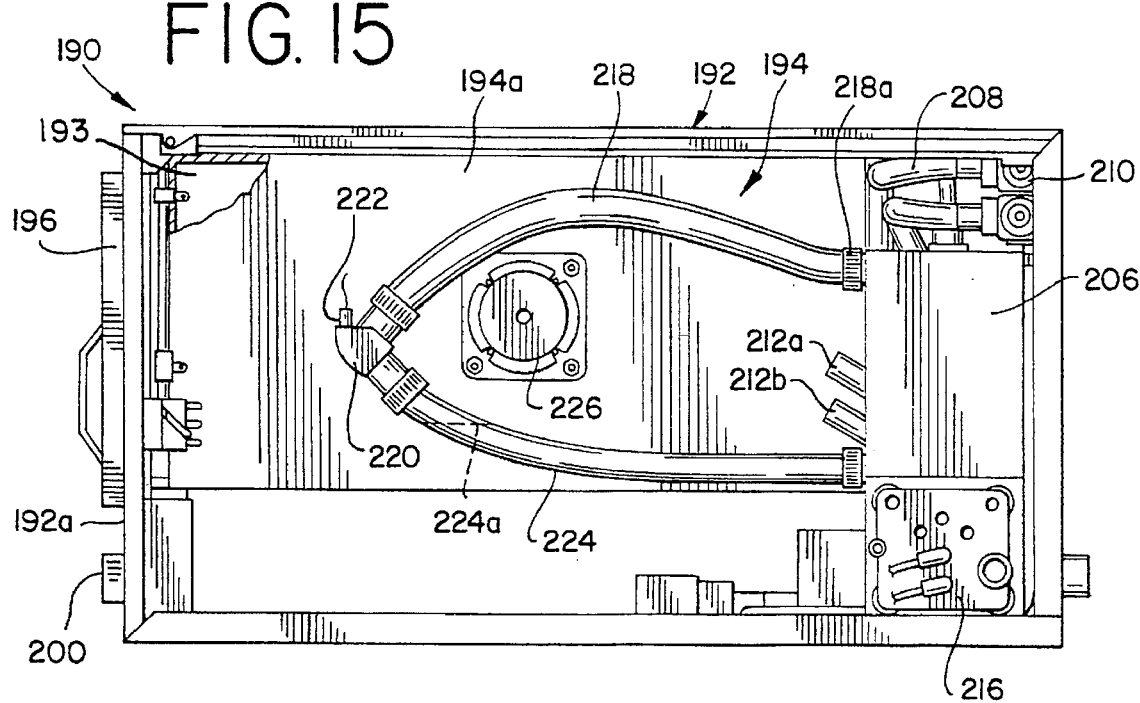

STEAMER APPARATUS

The is a continuation of application Ser. No. 08/344,233, filed Nov. 23, 1994 and now abandoned, which is a division of application Ser. No. 07/958,880, filed Oct. 9, 1992, now U.S. Pat. No. 5,368,008.

BACKGROUND OF THE INVENTION

The present invention relates generally to steamer apparatus, and more particularly to novel convection type steamer apparatus which, in various embodiments, employ at least one oven chamber and a steam generator operative to provide steam to the oven chamber in a highly efficient, reliable and economical manner.

It is well known in the art of cooking to employ forced convection type steam ovens, generally termed steamers, to heat food items placed within a cooking chamber or compartment. The art of steam cooking was developed as an alternative to cooking food in a free or forced-convection hot air environment. Surface heat transfer coefficients associated with condensing saturated steam are typically greater than those of circulating hot air. Foods cooked in steam cook more quickly, retain their moisture better, maintain their food values, and are generally more pleasing in appearance. Conventional steamers surround food objects with a continuous supply of saturated steam.

Historically, tabletop type single oven chamber steamers have utilized atmospheric steam generators to supply steam to the oven chambers because of the smaller size of atmospheric steam generators over pressure boilers. However, a significant drawback to prior steamers having atmospheric steam generators is that they are slow in responding to a call for steam and in bringing the oven chamber to a desired cooking temperature. The delay in providing steam upon command is due to maintaining the temperature of the water in the steam generator at less than its boiling temperature, such as at a temperature of approximately 185°–190° F. Thus, when responding to a demand for steam, as in a cooking cycle, the water in the boiler has to first be brought to its boiling temperature, and the oven chamber temperature then raised to a steam cooking temperature from a relatively cold condition. This can result in a delay of several minutes before actual cooking commences.

Prior double oven chamber steamers employ pressure boilers to supply steam to the oven chambers. A single pressure boiler supplies steam to both of the oven chambers through a valving arrangement. The double oven chambers are housed in an upstanding cabinet which has sufficient space beneath the oven chambers to accommodate a pressure boiler. Since pressure boilers maintain the heated boiler water under pressure, the heated boilers respond almost immediately to a demand for steam and are therefore faster than atmospheric steam generators in bringing the oven chambers to cooking temperatures. A drawback to pressure boilers is their relatively high cost. Also, as with prior single oven chamber steamers, the double oven chambers or cavities are relatively cold between cooking cycles and must be brought up to steam cooking temperatures, thus causing a time delay.

Significant improvements to prior single oven chamber steamers, and particularly tabletop type models having the capability to cook with steam or with dry oven heat, are disclosed in U.S. Pat. Nos. 4,851,644 and 4,817,582, both of which are owned by the assignee of the present invention and are incorporated herein by reference.

In both gas-fired and electrically heated steamers of known design, the steam is often introduced into the cooking chambers or cavities through relatively small orifices. These orifices frequently become clogged with lime buildup. Cleaning or deliming to clear the orifices is time consuming and leads to down time with attendant economic loss. Further, the boilers utilized in known steamers are such that cleaning or deliming solution must be introduced at the top of the boiler or by other means which are not easily accessible.

SUMMARY OF THE INVENTION

A general object of the present invention is to provide a novel steamer apparatus and method of operation wherein the steamer has one or a plurality of oven chambers each of which is heated by a discrete atmospheric steam generator and wherein the steamer has substantially improved operation, reliability and cost savings over prior steamer apparatus.

A more particular object of the present invention is to provide a novel steamer apparatus and method of operation wherein the steamer apparatus has at least one oven chamber and employs either an electrically heated or gas-fired atmospheric steam generator which is maintained at a quiescent power input level sufficient to maintain water within the steam generator at its boiling temperature and establish a flow of steam into the oven chamber to compensate for heat loss during a non-cooking mode, thereby maintaining the oven chamber in a ready condition for substantially instantaneous steam heating of items within the chamber during a cooking or heating cycle.

Another object of the present invention is to provide a novel steamer apparatus which, in one embodiment, employs a pair of stacked oven chambers each of which has a discrete atmospheric steam generator associated therewith, each steam generator being maintained at a quiescent power input during a non-cooking mode so as to maintain water in the steam generator at its boiling temperature and effect a continuous "ready" condition within the corresponding cooking chamber. During a timed heating or cooking cycle, power to the steam generator is increased to increase steam flow to the corresponding oven chamber and effect substantially immediate cooking.

In carrying out the present invention, a steamer apparatus is provided which, in either double or single oven chamber embodiments, employs an atmospheric steam generator for each oven chamber capable of providing substantially instantaneous steam to the corresponding oven chamber during a cooking cycle. During operation, but prior to a cooking cycle, the oven chambers are maintained in a continual state of readiness by applying a quiescent low power level to the corresponding steam generators sufficient to maintain water in the steam generators at its boiling temperature, such as 212° F. at sea level. Upon initiating a cooking cycle in an oven chamber, the power level to the corresponding steam generator is increased to increase steam flow to the corresponding oven chamber. The quiescent or low fire power level applied to each steam generator is controlled by a temperature sensor which senses at the oven chamber the flow of steam into the oven chamber so as to effectively sense the temperature within the oven chamber. This maintains the oven chambers in a ready condition irrespective of the actual boiling temperature of water within the corresponding steam generators, and eliminates any significant delay in bringing the oven chambers to a cooking condition as experienced with prior steamer apparatus.

The various embodiments of steamer apparatus in accordance with the present invention also provide an indication to the operator when the corresponding steam generators need cleaning or deliming, and enable a cleaning or deliming agent to be readily introduced into the steam generators from internally of the oven chambers, thus overcoming safety hazards present with prior steamers.

Accordingly, a feature of the steamer apparatus and method of operation in accordance with the present invention lies in continually sensing at each oven chamber the flow of steam into the oven chamber during a period of quiescent low fire power input to the corresponding steam generator sufficient to maintain water within the steam generator at its boiling temperature, thereby maintaining the oven chamber in a condition ready to effect substantially immediate cooking when a cooking or heating mode is initiated by increasing fire power to the steam generator, substantially irrespective of the atmospheric conditions in which the steamer is used.

Another feature of the steamer apparatus in accordance with the present invention lies in connecting each steam generator to its associated oven chamber through a steam inlet housing mounted on the oven chamber wall and having a thermostatic control temperature sensor thereon operative to sense the flow of steam into the oven chamber and maintain the associated steam generator at a quiescent power input level sufficient to maintain steam flow to the oven chamber during a non-cooking mode for substantially instantaneous cooking when required.

Another feature of the various embodiments of atmospheric steamer apparatus in accordance with the invention lies in connecting each oven chamber to its associated steam generator through a steam conduit having direct communication with the oven chamber in a manner enabling convenient introduction of a deliming/cleaning agent into the boiler through the steam conduit from internally of the oven chamber.

Still another feature of the stacked double-oven embodiment of the steamer apparatus in accordance with the present invention lies in providing a condensate drain line for each oven chamber and connecting the drain lines to a common vented drain tank having a water spray and baffle plate operative to quench and condense steam bubbles from the drain lines so as to prevent passage of steam out a vent tube or out a drain opening. The drain tank also prevents blockage of the vent tube and condensate drain lines by liquid entrapped in the drain tank.

Another feature of the present invention lies in providing a novel shaft seal arrangement for the oven chamber fan or blower drive motors.

Further objects, features and advantages of the present invention, together with the organization and manner of operation thereof, will become apparent from the following detailed description taken with the accompanying drawings wherein like reference numerals designate like elements throughout the several views.

BRIEF DESCRIPTION OF THE DRAWINGS

FIG. 1 is a perspective view of a double-oven atmospheric steamer constructed in accordance with one embodiment of the present invention;

FIG. 2 is a front elevational view of the double-oven steamer of FIG. 1, portions being broken away for clarity;

FIG. 7 is a vertical section/side elevational view of a gas-fired steam generator employed in the steamer of FIGS. 1–6, taken substantially along line 7—7 of FIG. 8;

FIG. 8 is a rear end view of the steam generator of FIG. 7, taken substantially along line 8—8 of FIG. 7;

FIG. 8A is a detail view, on an enlarged scale, of the structure encircled by line 8A in FIG. 8;

FIG. 9 is an end view taken substantially along line 9—9 of FIG. 7;

FIG. 14 is a perspective view of a countertop model single oven steamer in accordance with another embodiment of the present invention;

FIG. 15 is a side elevational view of the steamer of FIG. 14, taken along line 15—15 of FIG. 14 and with the right-hand cabinet sidewall removed for clarity;

DETAILED DESCRIPTION

Figure 3:
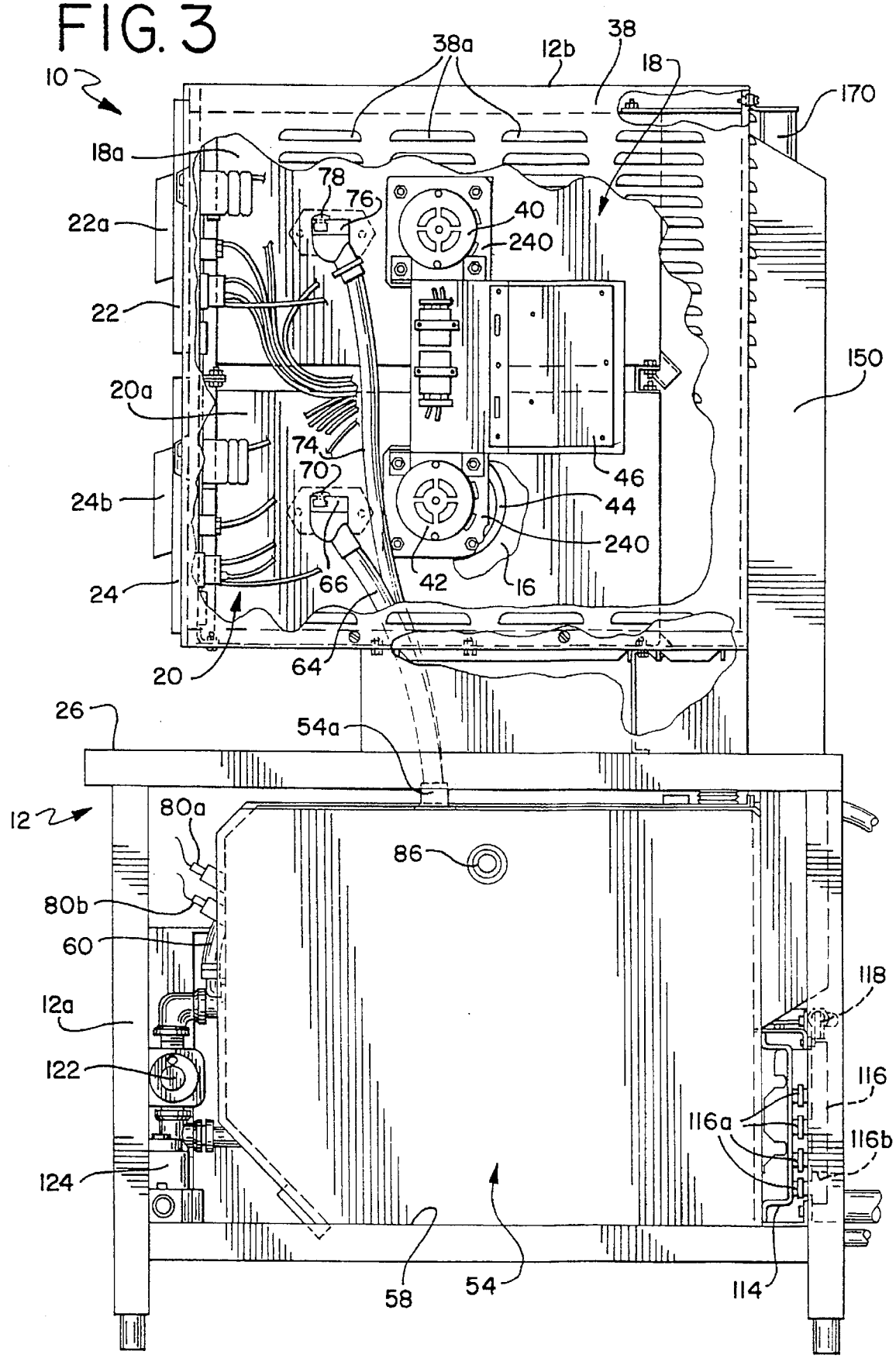
FIG. 3 is a side elevational view of the steamer of FIG. 1, portions being broken away for clarity.

Referring now to the drawings, and in particular to FIGS. 1–6, a steamer apparatus constructed in accordance with one embodiment of the present invention is indicated generally at 10. The steamer apparatus 10, which may be termed an atmospheric steamer, is of the free-standing double-oven type having an outer stainless steel cabinet 12 which includes a floor mounted base portion 12a and an upper oven chamber portion 12b preferably disposed at approximately chest height. As will be described, the lower base portion 12a houses a pair of atmospheric boilers or steam generators each of which is operatively associated with and provides steam at substantially atmospheric pressure to an associated one of two oven chambers or compartments housed within the upper cabinet portion 12b, such as an upper oven chamber 14 and a lower oven chamber 16 (FIG. 2).

As illustrated in FIG. 3, the upper and lower oven chambers 14 and 16 are defined within substantially identical generally rectangular oven housings 18 and 20, respectively, which are preferably made of a suitable stainless steel and have rectangular front access openings. The oven housings 18 and 20 are preferably insulated, as by an outer thermal insulating cover provided about each housing. Each of the oven chambers 14 and 16 has an insulated access door, indicated at 22 and 24, respectively, which is hinged at a corresponding hinge axis 22a and 24a to the upper cabinet 12b. When closed, each access door seals with the periphery of its associated oven compartment access opening through sealing means in the form of a suitable resilient heat resistant gasket (not shown) carried about the periphery of the door, as is known. Each access door 22 and 24 has a handle, indicated at 22b and 24b, respectively, which is vertically movable and releasably latchable with latch means mounted on the associated oven housing 18 or 20, such as a latch bullet as indicated at 25 in FIG. 6. The doors 22 and 24 are reversible for either left-hand or right-hand hinge mounting as disclosed more fully in U.S. Pat. No. 4,817,582.

Figure 4:
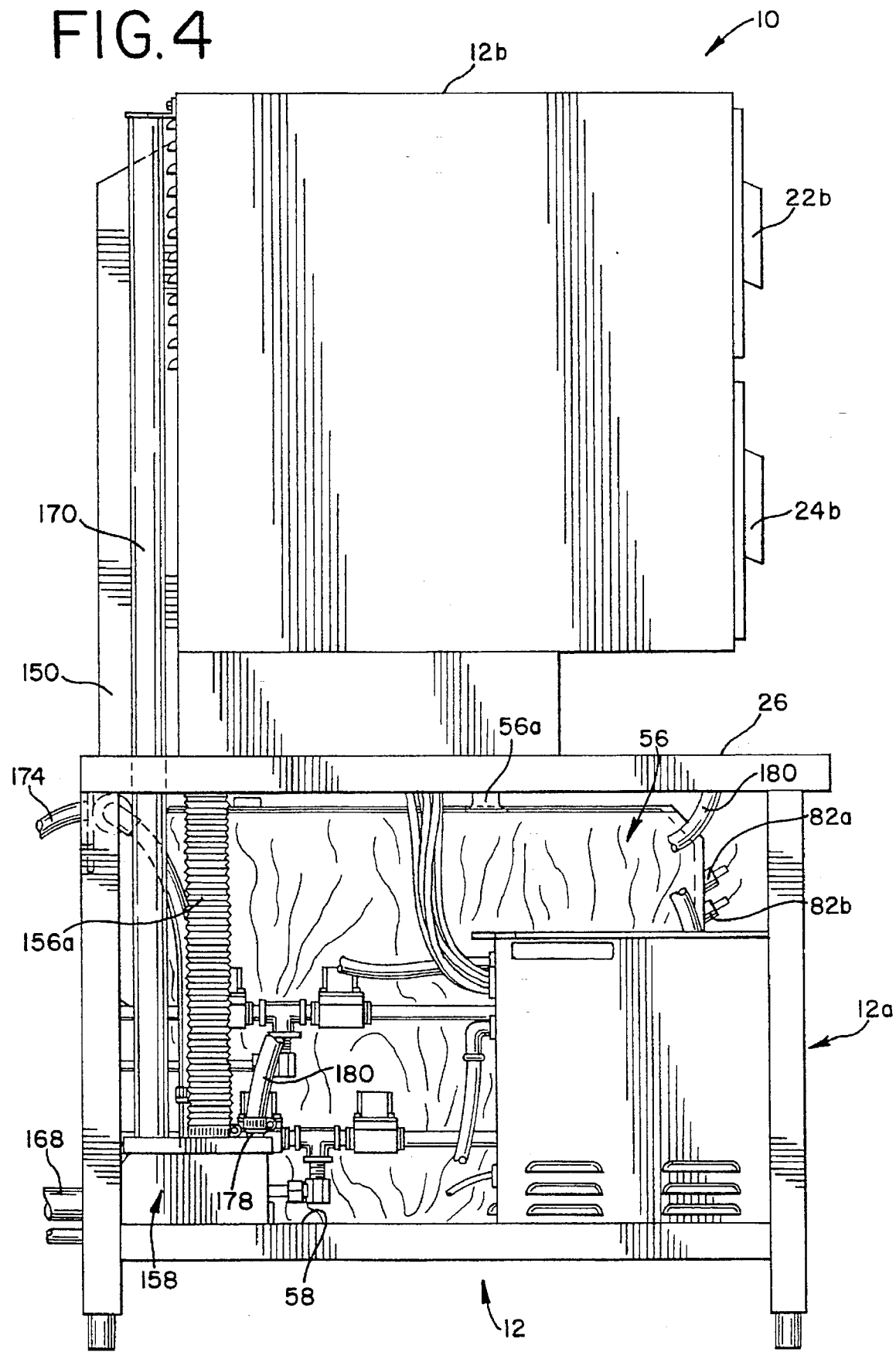
FIG. 4 is a side elevational view of the steamer of FIG. 1 showing the side opposite the side shown in FIG. 3 and with portions broken away for clarity.

As illustrated in FIGS. 1, 3 and 4, the upper cabinet portion 12b and associated oven chambers 14 and 16 are mounted on the base cabinet portion 12a so that a substantially horizontal shelf or ledge 26 is formed to underlie the oven chamber access openings and access doors 22 and 24. The shelf or ledge 26 preferably has a generally rectangular recessed or depressed sink portion 26a to enable any liquid condensate, spillage or drippings to migrate to a drain opening 26b and associated drain line to be hereinafter described. The laterally opposite sidewalls of the oven housings 18 and 20 are adapted to releasably support pan or tray support racks within the oven chambers 14 and 16, such as indicated at 27a and 27b in FIG. 2. A generally vertical wire type tray stop member 27c is fixed to the back wall of each oven chamber housing to prevent the trays from engaging the rear oven walls and inhibiting steam circulation.

A front control panel 28 on the upper cabinet portion 12b supports a power on-off switch for each oven chamber 14 and 16, indicated at 30a and 30b; a green "oven-ready" indicator light for each oven chamber, indicated at 32a and 32b, to provide a visual signal that the corresponding oven chamber has reached steam cooking temperature; a red "clean" indicator light, indicated at 33a and 33b, to provide a visual signal to the operator when the corresponding steam generator needs cleaning/deliming; and a manually settable timer control, indicated at 34a and 34b, for initiating increased volume steam flow to the corresponding oven chamber for selecting a timed heating or cooking mode or cycle. A green "timer on" light for each oven chamber, indicated at 35a and 35b, and a red "done" light 36a, 36b indicate when the timer is "on" and when it has completed a timed cooking cycle. A noise device, such as a buzzer, is also provided to provide an audible signal that a timed cooking cycle has been completed.

Figure 6:
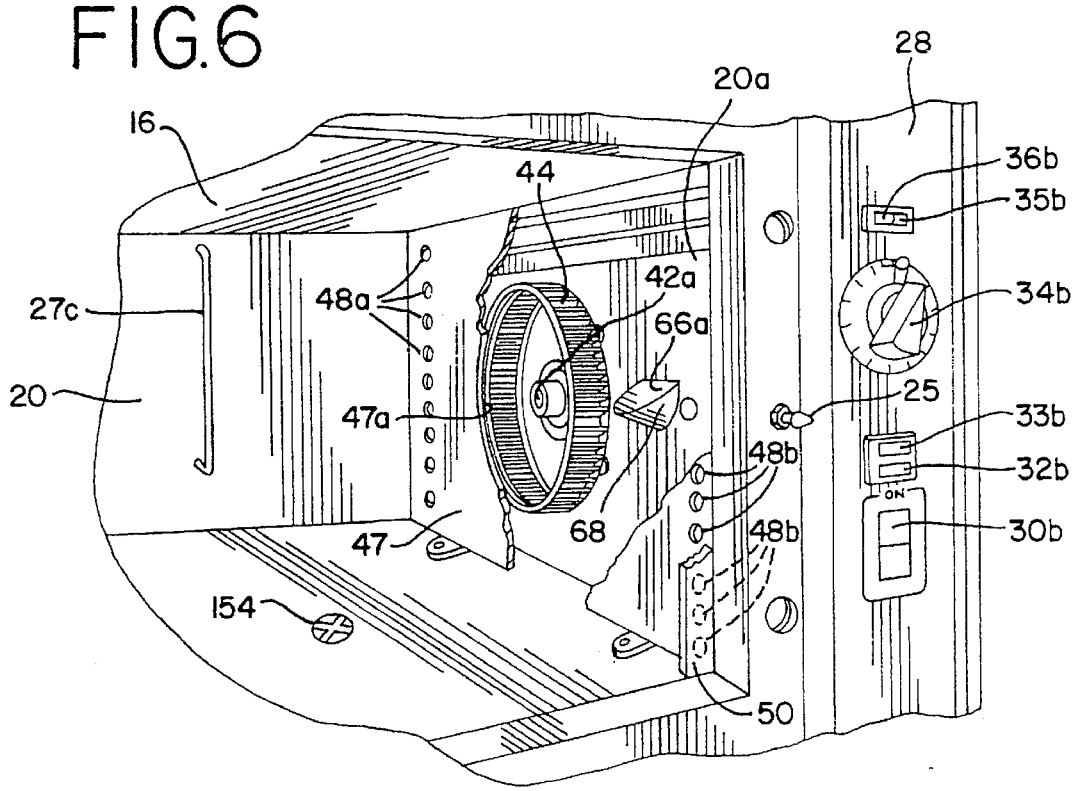
FIG. 6 is a fragmentary perspective view illustrating the interior of one of the steamer oven compartments having a sidewall orifice for introducing steam into the compartment and through which cleaning solution may be introduced in the boiler.

A sidewall 38 of the upper cabinet 12b is spaced laterally from the corresponding vertical sidewalls 18a and 20a of the oven housings 18 and 20 and preferably has a plurality of vent or air circulation openings formed by louvers 38a. The cabinet sidewall 38 forms a compartment laterally of the oven chamber housings 18 and 20 to facilitate mounting of fan or blower drive motors 40 and 42 on the sidewalls 18a and 20a of the oven housings generally centrally thereof. As illustrated in FIG. 6, each of the fan or blower motors 40 and 42 has a drive shaft, as indicated at 42a in FIG. 6, which extends through the corresponding sidewall 18a or 20a of the associated oven housing 18 or 20 and has an annular blower or fan wheel of known design mounted thereon, such as indicated at 44 in FIG. 6, for circulating steam within the corresponding oven chamber during a cooking cycle. A magnetic control switch, indicated schematically at 45 in FIG. 19A, is associated with each access door 22 and 24 so as to shut off power to the corresponding blower motor 40 or 42 when the access door is open. A circuit board 46 may be mounted adjacent the sidewall 18a for supporting control circuitry.

Referring to FIGS. 2 and 6, a planar rectangular baffle plate 47 is releasably supported within the oven chamber 16 in parallel inwardly spaced relation from the oven chamber housing wall 20a. The baffle plate 47 supports the tray racks 27b and has a circular opening 47a concentric with the blower wheel 44 and having a diameter slightly less that the blower wheel such that steam vapor and air in the oven chamber is drawn into the blower wheel for recirculation during rotation. A plurality of circular steam flow openings or ports 48a and 48b are formed through the baffle plate 47 in vertically spaced and aligned relation adjacent the rearward and forward vertical edges of the baffle plate. During a cooking cycle, steam entering the oven chamber 16 through the steam inlet orifice 66a is caused by the blower 44 to pass through the openings 48a and 48b, which are preferably about one-fourth inch diameter, into the cooking cavity. A deflector baffle bar 50 is fixed to the forward vertical edge of the baffle plate 47 and prevents steam from spraying into the access opening in oven chamber 16 when the access door 24 is opened, thus preventing steam from directly spraying on the operator.

In accordance with one feature of the present invention, each of the oven chambers 14 and 16 has a discrete steam generator or atmospheric boiler associated therewith in a manner to introduce steam into the oven chamber. In the embodiment illustrated in FIGS. 1-5, a pair of gas-fired steam generators, indicated at 54 and 56, are supported within the lower base portion 12a of the cabinet 12, such as on a horizontal support plate 58. The steam generators or atmospheric boilers 54 and 56 are substantially identical and each includes a generally rectangular outer shell or housing having a longitudinal length, considered from front to back of the cabinet base, and vertical height substantially greater than the lateral width of the boiler. Each of the steam generators 54 and 56 has a water fill conduit, indicated at 60 and 62, respectively, interconnected to a forward end of the steam generator and extending to the rear of the steamer apparatus to enable connection to a water supply through a suitable control valve (not shown).

A steam flow conduit 64 is connected at one end to a steam outlet 54a at the top of the steam generator 54, and is connected at its opposite end to a steam inlet housing 66 mounted on the sidewall 20a of the lower oven housing 20 at generally its mid-height, as shown in FIG. 3. The steam inlet housing 66 has an internal steam flow passage which terminates in a steam discharge orifice 66a opening directly into the oven chamber 16, as illustrated in FIG. 6. Preferably, the steam discharge orifice 66a is positioned relatively close to the periphery of the corresponding annular fan or blower 44 so that steam discharged into oven chamber 16 is immediately circulated throughout the oven chamber by the blower during a cooking cycle or mode, thereby resulting in more uniform heating of items disposed within the oven chamber. A generally funnel-shaped member 68 is formed on the housing 66, or otherwise suitably secured to the inner surface of the oven housing wall 20a, so as to extend generally peripherally about the discharge orifice 66a. The funnel member 68 facilitates convenient pouring of a cleaning or deliming solution into the steam conduit 64 and into the water chamber within the boiler 54 for cleaning and deliming of the steam generator and associated oven chamber. In this manner, a cleaning or deliming solution may be conveniently poured into the steam conduit 64 and the boiler 54 from within the oven chamber during a cleaning and deliming operation, rather than having to access a rear mounted boiler from the top and rear of the associated steamer, or by other means, in a hazardous manner, as required by known prior steamers.

In accordance with another feature of the invention, the steam inlet housing 66 is made of a suitable non-corrosive metal having sufficient mass to act as a heat sink which is relatively non-responsive to sudden temperature changes within the associated oven chamber 16. With steam flowing through the steam conduit 64 and discharging from the discharge orifice 66a, the steam inlet housing 66 will reach a temperature generally equal to the temperature of the steam being conducted into the oven chamber. If the oven access door 24 is thereafter opened, the temperature drop within the oven chamber 16 does not effect an immediate change in temperature of the inlet housing 66. A thermostat switch type temperature sensor 70 of known design is mounted on the steam inlet housing 66 and senses the temperature of the inlet housing and thereby the temperature of the steam flowing through the steam conduit 64 into the oven chamber 16. With the oven door 24 closed, the temperature within the oven chamber 16 will reach substantially the same temperature as the incoming steam so that the inlet housing 66 effectively also senses the temperature within the oven chamber 16.

When the main control switch 30b for oven chamber 16 is initially turned "on", the temperature control sensor 70 enables full heating or "high fire" power, such as 45,000 BTU/hr., to the steam generator 54 to rapidly heat water within the steam generator to its boiling temperature to create steam. If the timer switch 34b is not "on" when the temperature within the oven chamber 16 reaches a predetermined minimum temperature, such as approximately 185° F., as sensed by the temperature sensor 70, the thermostat switch 70 opens to reduce the heat energy or power input to the steam generator 54 to a quiescent "low fire" power level, such as 4,000 BTU/hr., so as to maintain the water within the steam generator at its boiling or simmering temperature which is 212° F. at sea level. Due to the temperature lag created by the mass of the steam inlet housing 66, when the temperature sensor 70 detects approximately 185° F., the temperature within the oven chamber 16 will be substantially equal to the boiling temperature of water in the steam generator. This maintains steam flow through the steam inlet housing 66 into the oven chamber 16 and maintains the oven chamber 16 in a "ready" mode or condition for substantially immediate cooking when called upon for a cooking mode or cycle through the corresponding timer control 34b. When the cooking timer 32b is set to effect a cooking mode or cycle within oven chamber 16, full input or "high fire" heating power is applied to the steam generator 54 to increase the rate or volume of steam flow into oven chamber 16. When the cooking time set by the timer 34b has expired, a buzzer or other preferably audible signal is triggered to indicate the end of the cooking cycle. At this time, the power input to the steam generator 54 is reduced to the "low fire" quiescent power level and maintained at the quiescent power level by the temperature sensor 70 whereby to maintain the water in the steam generator at its boiling or simmering temperature and maintain the oven chamber 16 in a ready condition for a subsequent cooking cycle.

In similar fashion to the steam generator 54, the steam generator 56 has a steam conduit 74 connected at one end to a steam outlet 56a (FIG. 4) on the top of steam generator 56, and is connected at its opposite end to a steam inlet housing 76 which is identical to the steam inlet housing 66 and is mounted on the sidewall 18a of the upper oven housing 18, as illustrated in FIG. 3. The steam inlet housing 76 has a thermostat type temperature sensor 78 supported thereon, and is similarly mounted approximately mid-height of the sidewall 18a and accessible from the oven access opening. The inlet housing 76 has an internal steam flow passage and steam discharge orifice opening directly into the oven chamber 14 similar to the steam inlet housing 66. Similarly, a funnel-like member (not shown) is mounted on or associated with the steam inlet housing 76 to facilitate convenient pouring of a cleaning or deliming solution into the steam conduit 74 and into the steam generator 56 from internally of the oven chamber 14 during cleaning or deliming of the steam generator 56.

The steam discharge orifices in the steam inlet housings 66 and 76, such as indicated in 66a in FIG. 6, are substantially larger in diameter, such as approximately 1½ inch diameter, than conventional steam orifices through which steam is introduced into the oven chambers of prior steamers. During operation of the prior steamers which employ a plurality of relatively small diameter steam inlet orifices, the orifices undergo lime buildup about the periphery of the orifices which greatly reduces the flow area of the orifices with substantially diminished efficiency. The larger diameter steam discharge orifices in the steam inlet housings 66 and 76 of the present invention lend themselves to substantially longer operating periods without lime buildup or deposits significantly inhibiting efficient operation of the steamers.

Each of the steam generators 54 and 56 has water level sensor means in the form of a pair of water level sensor probes, indicated at 80a,b and 82a,b, respectively, in FIGS. 2 and 3. The sensor probes 80a,b and 82a,b are of conventional design and extend into their corresponding steam generators so as to be covered by water within the steam generators reaching the predetermined levels of the exposed sensor probes. The upper sensor probes 80a and 82a are connected to a control circuit which controls the supply of water into the corresponding steam generators during operation of steamer 10. With a steamer power switch 30a or 30b in an "on" condition, the water supply circuit is operative through a normally closed solenoid control valve, indicated schematically at 84 in FIG. 19A, to admit water into the corresponding steam generator when the corresponding upper sensor probe 80a or 82a is not covered by water; that is, when the water level within the steam generator is below the level of the upper sensor probe. When the water level within a steam generator reaches the level of and covers the corresponding upper water level sensor probe 80a or 82a, the water supply circuit shuts off water to the corresponding steam generator.

The lower level water sensor probes 80b and 82b are connected in a control circuit which controls heating of the steam generators 54 and 56. If the water in a steam generator is at its upper level, as detected by the upper sensor probes 80a and 82a, the lower sensor probes 80b and 82b will similarly be covered by water. The sensor probes 80a,b and 82a,b are normally electrically conductive when covered by water, and nonconductive when not covered by water, as is known. If a steamer power switch 30a or 30b is "on", and the corresponding water level sensor probe 80b or 82b detects the presence of water within the corresponding steam generator, either full power or quiescent low fire power will be applied to the steam generator, as aforedescribed. If either of the lower water level sensor probes 80b or 82b does not detect the presence of water, that is, it is not covered by water, the control circuit for the corresponding steam generator is conditioned to stop or temporarily suspend the heat source or fire power to the steam generator.

The sensor probes 80b and 82b also serve as "clean" instruction probes. The sensor probes 80b and 82b are each connected in a logic circuit with their corresponding upper water level sensor probes 80a and 82a. Each logic circuit does a logic check on the corresponding set of sensor probes 80a,b and 82a,b during filling of the corresponding steam generator with water. If a predetermined logic sequence is not detected, the red "clean" light 33a or 33b corresponding to the steam generator being filled is energized to provide the operator with a visual signal that the steam generator should be delimed. In effect, each pair of sensor probes 80a,b and 82a,b is monitored. If the probes 80b and 82b do not operate in proper logical sequence with their corresponding sensor probes 80a and 82a, they trigger the corresponding "clean" light 33a or 33b to indicate deliming of the corresponding steam generator should be undertaken. This is because, to a very high probability, the sensor probes 80b or 82b have limed over and are temporarily malfunctioning, either in an erroneous conducting state or in an erroneous nonconducting state.

An example of a proper operating logic sequence for each pair of sensor probes 80a,b and 82a,b is as follows; using probes 80a,b as representative. When the steam generator 54 is filling with water, the lower sensor probe 80b will first detect the presence of water, followed by the sensor probe 80a sensing the presence of water and shutting off the water supply. As is known, the logic circuit allows for a predetermined time lag between detection of water by sensor probe 80b and sensor probe 80a. If this time lag is exceeded, the control circuit will shut off the water supply due to either malfunction of the water supply or liming over of the upper sensor probe 80a so that it does not correctly sense the presence of water. This will cause the red "clean" light 33b to be energized. If the sensor probe 80b has limed over so as to be nonconducting in the presence of water, and the sensor probe 80a detects the presence of water, the "clean" light 33b will be energized to indicate that the steam generator 54 should be delimed. Conversely, when draining the steam generator, the sensor probe 80a should first detect the absence of water, i.e. go to a nonconducting state, followed by the sensor probe 80b going to a nonconducting state. If the sensor probe 80b continues to indicate the presence of water in the steam generator after a predetermined allowed time lag following probe 80a going to a nonconducting state, the "clean" light 33b will be energized to indicate the steam generator needs deliming. In this case, the sensor probe has limed over with a damp or wet lime coating when maintains probe 80b in a conducting state. A logic circuit for accomplishing such a logic sequence may be readily designed by one skilled in the art using transistor circuitry.

Each of the boilers 54 and 56 also is provided with pressure relief means in the form of a pressure relief plug of conventional design, such as the pressure relief plug 86 shown in FIG. 3.

FIGS. 7–10 illustrate in greater detail the steam generator or atmospheric boiler 54 which is preferably made of stainless steel and is identical to the steam generator 56. As shown, the outer shell of the steam generator 54 has a pair of parallel side walls 90 and 92 which are generally rectangular and interconnected along their full top, front, and bottom marginal edges by an upper wall 94, a front wall 96, and a bottom 98 which is inclined upwardly at its forward end and has a cleanout port 98a formed therein having a closure plug. A drain tube 99 is also provided at the bottom rear of the steam generator 54. A pair of water level sensor support tubes 96a and 96b are formed on the front wall 96 to support the aforedescribed liquid level sensor probes 80a and 80b, respectively. The steam generator 54 has a rear wall 100 secured at its outer marginal edges to the sidewalls 90, 92, the top wall 94, and the bottom wall 98 in sealed relation therewith. The rear wall 100 has a generally rectangular opening 100a which is sized to receive heater means in the form of a gas-fire tube assembly 104.

The firetube assembly 104 is generally rectangular in transverse cross-section and has a pair of sidewalls 106 and 108 which are connected along their full upper, lower, and front marginal edges to a peripheral wall 110. The sidewalls 106 and 108 are spaced apart a distance less than the distance between the sidewalls 90 and 92 of the outer shell of steam generator 54, and are spaced inwardly from the corresponding sidewalls 90 and 92. The rear edges of the firetube assembly sidewalls 106 and 108 and the upper and lower rear edges of the peripheral wall 110 are connected to the rear wall 100 of the boiler within the rectangular opening 100a so as to create a substantially closed water chamber within the boiler 54 which is in heat transfer communication with the sidewalls 106, 108 and wall 110 of the firetube assembly.

Figure 5:
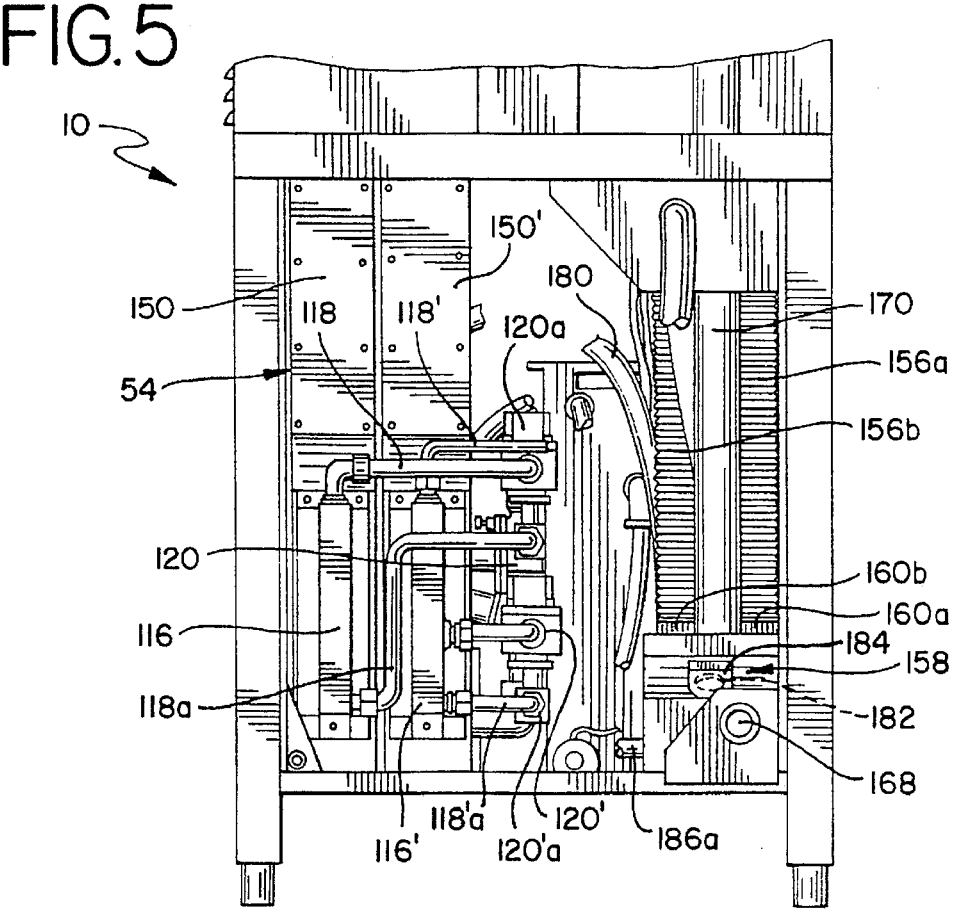
FIG. 5 is a fragmentary rear view of the base portion of the steamer of FIG. 1 but with the base back panel removed for clarity.

A burner support bracket 114 is secured to the rear wall 100 of the boiler 54 and supports steam generator heating means in the form of a gas-fired heater which includes a gas manifold 116 (FIGS. 3 and 5). The manifold 116 supports a plurality of vertically spaced coplanar burner nozzles of known design, such as the four burner nozzles indicated at 116a in FIG. 3, which extend generally horizontally into a lower portion of the firetube assembly 104 and are operative to create a flow of heated air through the firetube assembly to boil water within the steam generator 54.

Figure 18:
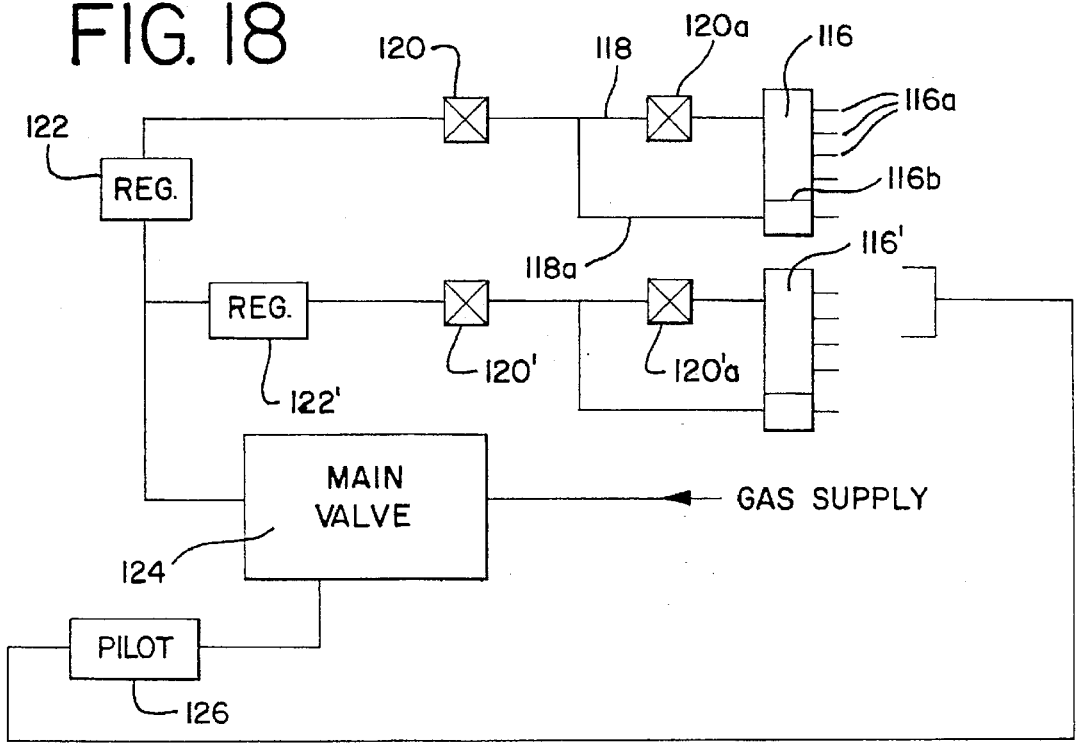
FIG. 18 is a schematic diagram of the combustion gas lines and associated control valves for controlling the heaters for the gas-fired steam generators employed in the steamer of FIGS. 1–5.

Each of the burner nozzles 116a preferably has an associated flame spreader (not shown) of conventional design to create a vortex that draws air into the combustion products which are directed into a plurality of firetube channels to be hereinafter described. The manifold 116 is divided by a baffle 116b (FIG. 3) to create a bottom "low fire" burner nozzle below the upper "high fire" nozzles. The manifold 116 is connected to a source of combustion gas through a pair of gas supply lines 118 and 118a (FIG. 5). As shown schematically in FIG. 18, the gas supply line 118a supplies gas to the bottom low fire burner nozzle, and the gas supply line 118 supplies combustion gas to the remaining burner nozzles which may be termed "high fire" nozzles and which combine with the low fire nozzle to provide full high fire power to the steam generator. A normally closed solenoid control valve, indicated at 120, controls gas flow to supply lines 118 and 188a from a gas pressure regulator valve 122 (FIG. 2) which in turn is connected to a main gas control valve 124 controlling gas flow from the main gas supply. The control valve 120 is controlled by the logic control circuit for the sensor probes 80a,b, so that valve 120 is always open when the probe 80b is covered by water and the pilot light is on. A normally closed solenoid control valve 120a is connected in the gas supply line 118 downstream from control valve 120 to control gas to the high fire burner nozzles. The control valve 120a is controlled by the thermostat temperature sensor 70 when the timer switch 34b is on. The gas control valve 124 and solenoid valves 120 and 120a enable the low fire burner nozzle to provide the aforedescribed quiescent low power input to the steam generator 54, or enable combustion gas flow to all of the burner nozzles to provide full high fire power to the steam generator. A similar burner control is provided for the gas manifold 116 associated the steam generator 56. A pilot indicator 126 of conventional design controls on/off operation of a pilot light flame for each firetube burner assembly.

Referring again to FIGS. 7–10, a plurality of substantially horizontal heat flow passages, indicated at 130a–e, are formed within the lower one-half of the firetube assembly 104. The flow passages 130a–e are defined by pairs of laterally aligned generally L-shaped baffles 132 and 134 which are fixed to the inner surfaces of the sidewalls 106 and 108 so that free longitudinal edges of each pair of baffles 132 and 134 are spaced apart a distance equal to approximately one-fourth the lateral spacing between the sidewalls 106 and 108, as illustrated in FIG. 8. The pairs of baffles 132, 134 are vertically spaced and positioned longitudinally so that the discharge ends of horizontal gas nozzles (not shown) supported by the manifold 116 are closely adjacent the entry ends of the flow passages 130a–e.

In accordance with one feature of the invention, the firetube assembly 104 is divided generally at its mid-height into upper and lower halves by slip joint baffle means in the form of a horizontal elongated baffle plate 138 fixed in normal relation to the inner surface of the sidewall 106 and having a free longitudinal edge 138a slidable between a pair of generally L-shaped longitudinally extending angles 140a and 140b which are secured to the inner surface of the opposed sidewall 108. The angles 140a,b are spaced apart to receive the free edge of the baffle plate 138 in a sealed sliding relation, as shown in FIG. 8A. The baffle plate 138 and angles 140a,b cooperate to provide a substantially horizontal partition which, as seen in FIG. 7, extends generally the same length of the firetube assembly as the baffles 132, 134, and separates the heat flow passages 130a–e from the upper half of the firetube assembly while enabling thermal expansion and contraction of the firetube assembly, and particularly the opposed sidewalls 106 and 108.

Figure 10:
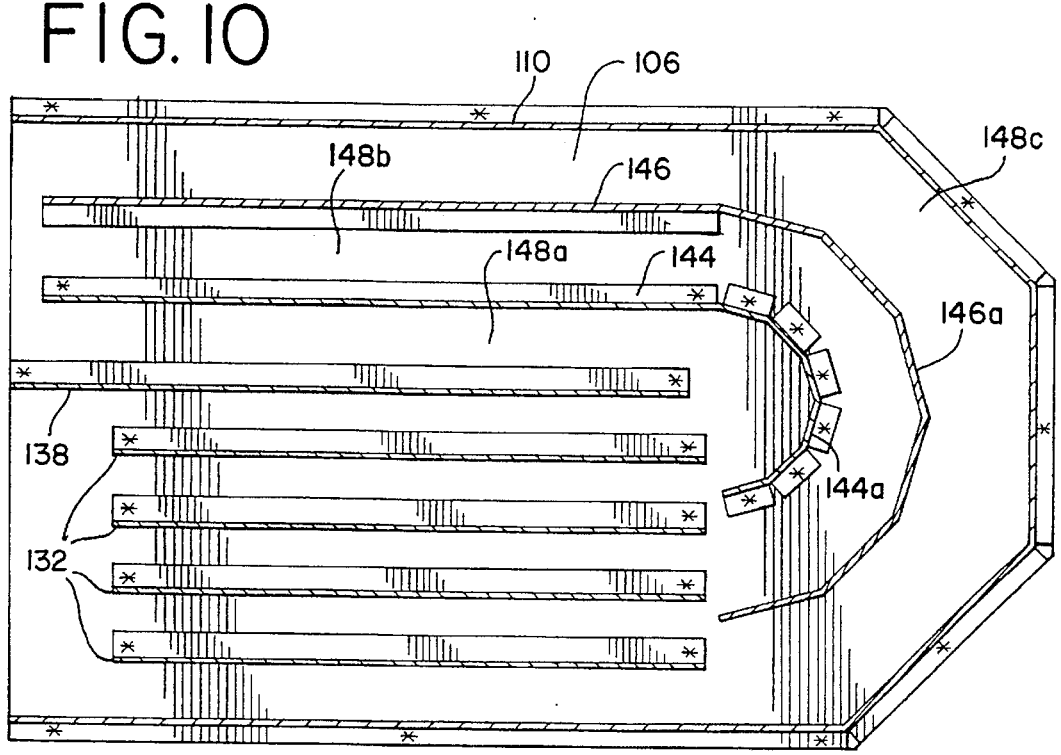
FIG. 10 is a vertical sectional view taken along line 10—10 of FIG. 8.

Referring to FIGS. 7 and 10, taken in conjunction with FIG. 8, heated air passing through the heat flow passages 130a–e from the firetube manifold 116 enters a plurality of curvilinear paths defined by baffles 144 and 146 and the peripheral wall 110 of the firetube assembly. The baffles 144 and 146 are generally Z-shape in transverse cross-section and have right-angle flanges formed along their longitudinal edges. Each baffle 144, 146 has one flange secured to a selected one of the sidewalls 106 and 108, as by resistance welding, with the opposite longitudinal flange being in abutting relation with the opposed sidewall 106 or 108 but not being secured thereto, thereby enabling thermal expansion and contraction of the sidewalls 106 and 108. The baffles 144 and 146 have radially curved forward end portions, indicated at 144a and 146a, respectively, which are disposed substantially parallel to each other and define generally uniformly curved flow paths or passages 148a–c which receive heated air leaving the flow passages 130a–e and cause the heated air to undergo substantially 180° flow reversal as it passes through the firetube assembly 104. In this manner, the heated air in the firetube assembly undergoes a double pass contacting relation with the firetube sidewalls 106 and 108 with substantially improved heat transfer to the water within the boiler.

The various baffles 132, 134, 138, 144 and 146 are made of a corrosion resistant high heat transfer material, such as 16 gauge stainless steel, so as to effect heat transfer through the sidewalls 106 and 108 both from heated air directly contacting the sidewalls and from the heated baffles. As the heated air flows through the discharge ends of the double pass flow paths 148a–c, it is discharged or exhausted into a vertical vent or exhaust passage defined within a suitable exhaust duct 150 which communicates with the discharge ends of the flow passages 148a–c and extends upwardly along the rear of the upper cabinet 12b as illustrated in FIG. 3.

As aforedescribed, the boiler or steam generator 56 is substantially identical to the boiler 54. The boiler 56 thus has a gas manifold 116' and an exhaust duct 150' associated therewith so as to operate in substantially identical fashion to the boiler 54. If desired, electrically heated boilers or steam generators can be used in place of the gas-fired boilers 54 and 56.

Figure 11:
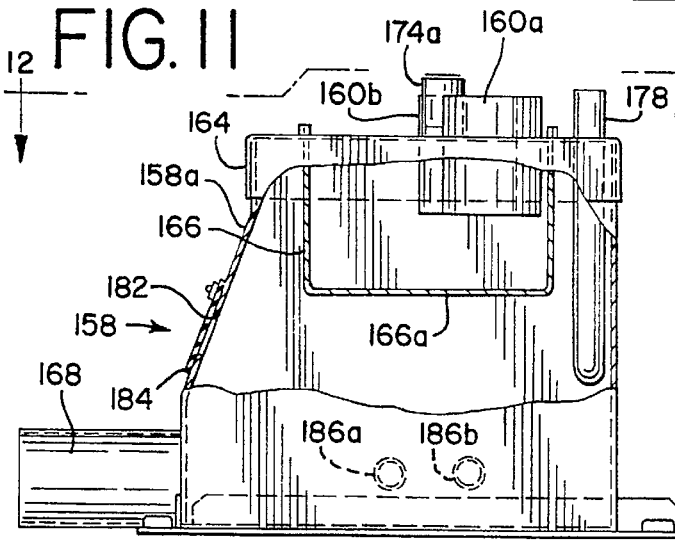
FIG. 11 is a side elevational view of the condensate drain tank employed in the double oven steamer of FIG. 1, portions being broken away for clarity.
Figure 13:
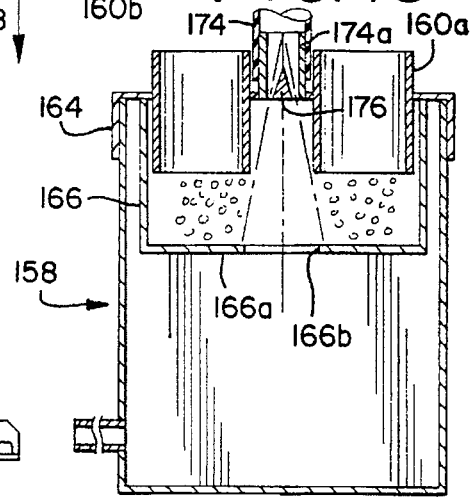
FIG. 13 is a vertical sectional view taken substantially along line 13—13 of FIG. 12.
Figure 12:
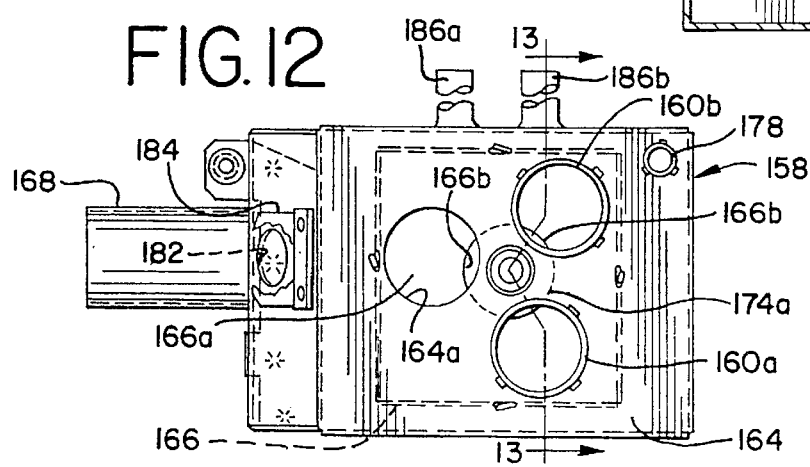
FIG. 12 is a plan view of the drain tank of FIG. 11, taken along line 12—12 of FIG. 11.

Each of the oven chambers 14 and 16 has a drain port or opening in the floor portion of the corresponding oven housing 18 and 20, respectively, such as indicated at 154 in the oven housing 20 illustrated in FIG. 6. The drain ports receive condensate from the walls of the corresponding oven chamber and any drippings from items being steam heated or cooked. Drain lines, indicated at 156a and 156b in FIG. 5, connect the drain ports in the oven chambers 14 and 16 to a drain tank or box 158 supported on the support plate 58 within the lower base portion 12a of the steamer cabinet 12. As illustrated in FIGS. 11–13, the drain tank or box 158 is generally rectangular and has an upper removable cover 164 to which a pair of drain line couplings 160a and 160b are secured for attachment of the drain lines 156a,b. A substantially rectangular five sided baffle 166 is secured to the underside of the cover 164 so that a lower wall 166a of the baffle 166 serves as a tank baffle plate which is parallel to the upper wall of the cover 164 and is spaced below discharge ends of the drain tank couplings 160a,b. A circular drain opening 166b is formed centrally in the baffle plate 166a to enable quenched steam condensate to flow into the lower region of the drain tank 158 for discharge through a discharge tube 168 affixed to the lower rear end of the drain tank.

A vent pipe or tube 170 (FIG. 4) has a lower end fixed to the drain tank cover 164 periphery of a circular opening 164a and extends upwardly along the rear of the steamer 10 to connect the interior of the drain tank 158 to atmosphere. As illustrated in FIG. 12, the center of the vent pipe opening 164a in the tank cover 164 lies on a circle which intersects the center axes of the drain line couplings 160a and 160b and is concentric with the drain opening 166b formed in the baffle plate 166. The centers of opening 164a and couplings 160a,b lie at the corners of an equilateral triangle. A water supply line 174 is connected to the drain tank cover 164 through a tubular coupling 174a having its center axis coincident with the axis of the baffle discharge opening 166b. A spray nozzle 176 of conventional design is mounted within the discharge end of the water supply coupling 174a so as to cause water received from the supply line 174 to be discharged into the drain tank in a conical spray of sufficient diameter to impinge upon the lower baffle plate 166a peripherally of the drain opening 166b. The conical spray creates a water mist below the drain couplings 160a,b and the vent pipe opening 164a. In this manner, any steam or steam bubbles entrained in condensate draining from the oven chambers 14 and 16 through the drain lines 156a and 156b enters the drain tank 158 within the tank baffle 166 and is condensed or quenched by the water mist created within the drain tank. The condensed steam migrates to and passes through the baffle drain opening 166b into the bottom of the drain tank for discharge through the drain tube 168. The water spray mist also prevents upward discharge of steam through the vent pipe 170 to atmosphere.

The drain tank 158 also supports a tubular drain line or coupling 178 which is connected to the aforedescribed drain opening 26b in the recessed ledge or sink 26a below the oven chamber access openings through a drain line 180 (FIG. 4) so that spillage or drippings from the drain opening 26b flow to the drain tank 158. As a safety feature, the drain tank 158 has a circular overflow drain or discharge opening 182 formed in an inclined wall 158a spaced above the drain tube 168. A flapper valve in the form of a flexible rubber flap 184 is suitably mounted on the drain tank wall 158a to overlie the overflow opening 182 and has sufficient flexibility to allow liquid buildup within the drain tank to the level of opening 182 to flow outwardly of opening 182 without splatter, such as if the drain line 168 becomes clogged. The drain or discharge opening 182 is located so that water in the drain tank 158 never reaches a level to close off the bottoms of the drain line couplings 160a,b or the bottom of the vent tube 170.

A pair of boiler drain line couplings 186a and 186b are fixed to a side of the drain tank 158 adjacent its lower end. The couplings 186a,b facilitate connection of drain lines from the bottoms of boilers 54 and 56 to the drain tank. Solenoid actuated pinch valves of conventional design (not shown) are preferably provided in the drain lines from the boilers to the drain tank 158 to enable selective opening of the drain lines for blow down or flushing of the boilers.

Figure 16:
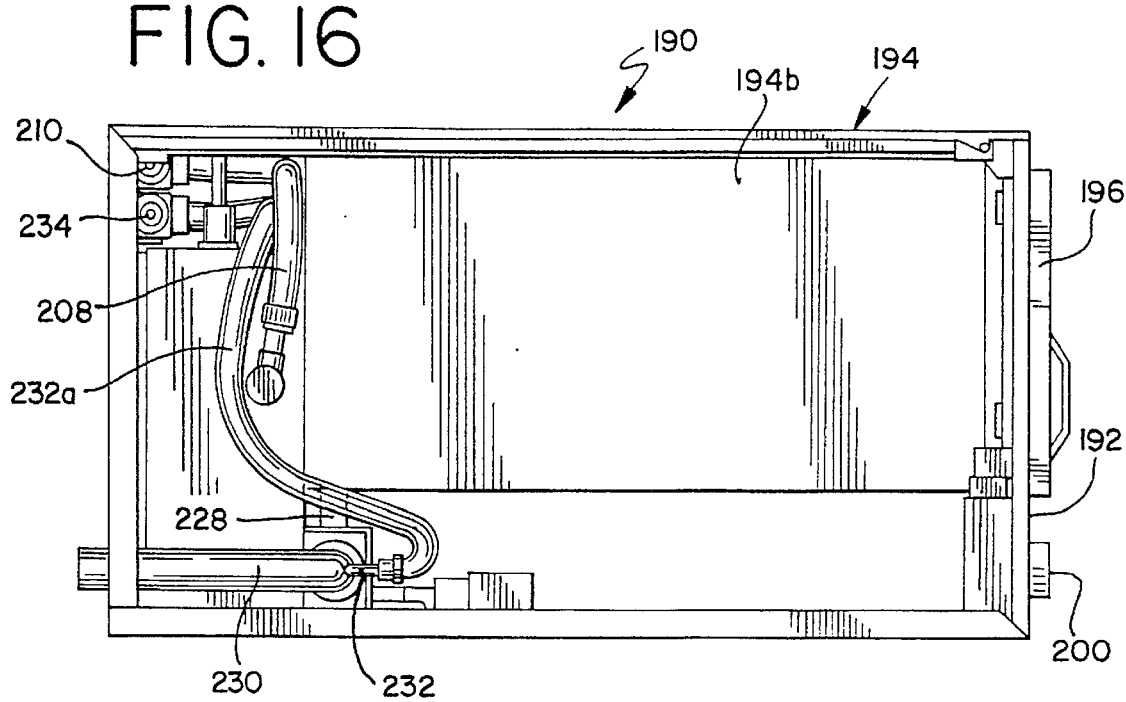
FIG. 16 is an elevational view of the opposite side of the steamer of FIG. 14, taken along line 16—16 of FIG. 14 and with the left-hand cabinet sidewall removed.

FIGS. 14–16 illustrate an alternative embodiment of a steamer apparatus, indicated generally at 190, which is of the single-oven countertop type. The steamer apparatus 190, which may also be termed a steamer, includes a generally rectangular outer cabinet 192 and an internal oven chamber 193 defined by a generally rectangular insulated oven housing 194. The oven housing 194 has vertical sidewalls 194a and 194b and a rectangular front access opening accessible through an insulated access door 196 hinged at 196a to a front wall 192a of the cabinet. The door 196 carries a closure handle 198 similar to the aforedescribed handles on the oven doors 22 and 24, and is latchable in sealed closed relation with the oven access opening. A releasible drip catch 200 is preferably mounted on the front wall 192a of the cabinet 192 to catch spillage or drippings at the entrance to the oven chamber as items are inserted into and removed from the oven chamber. A control panel 202 is mounted on the forward wall 192a of the steamer cabinet 192 and has a power on-off switch 202a, a green "oven ready" indicator light 202b, a red "clean" indicator light 202c, a manually settable timer 202d, a "timer on" indicator light 202e, and a red "done" light 202f, similar to the controls and indicator lights for each of the oven chambers 14 and 16 of the double oven steamer apparatus 10. A vented sidewall 192b of the cabinet 192 is spaced from the right-hand wall 194a of the internal oven chamber to establish a compartment for various controls and the like employed in the steamer 190.

Steam is supplied to the oven chamber 193 of the steamer 190 from an atmospheric steam generator 206, alternatively termed an atmospheric boiler, which in the embodiment of FIGS. 14–16 is electrically heated. The steam generator 206 is generally rectangular and is mounted within the cabinet 192 so as to extend across the rear of the oven housing 194 between the lateral sidewalls of the cabinet 192. The steam generator 206 is of substantially greater longitudinal length and vertical height than transverse width, and is connected through a fill line or conduit 208 and an associated solenoid control valve 210 to a water supply externally of the steamer. A pair of water level sensor probes 212a and 212b are mounted on the steam generator 206 and are operative to sense the water level within the steam generator. The upper sensor probe 212a controls water input into the steam generator in similar fashion to the aforedescribed sensor probes 80a and 82a. The lower sensor probe 212b is similarly connected in a logic circuit with the upper sensor probe 212a and causes the "clean" light 202c to be energized when either of the probes 212a or 212b becomes inoperative due to liming over. This indicates to the operator that the steam generator 206 should be delimed.

The steam generator 206 has electrical heater means which may comprise a cal rod type heater of known design mounted on a mounting plate 216 which is affixed to the right-hand end of the steam generator 206, as illustrated in FIG. 15. The cal rod heater includes three cal rod resistor heater bars which are of generally identical U-shape and extend into the steam generator in parallel spaced relation for direct heating relation with water in the steam generator. Each U-shaped cal rod comprises an approximately 2.83 kw heating element so as to apply 9 kw to the water in the steam generator during a "full fire" heating mode. A 500 watt resistance heater element is also supported within the steam generator 206 and acts with the cal rod heaters during full fire heating. The 500 watt heater is also operative to maintain a low fire quiescent heat input to maintain the water at its boiling temperature during a non-cooking but "ready" mode.

In accordance with one feature of the countertop type steamer 190, steam is supplied to the oven chamber 193 through a steam conduit 218 having one end connected at 218a to a steam chamber within the steam generator 206, and having its opposite end connected to a steam inlet housing 220. The steam inlet housing 220 is similar to the aforedescribed steam inlet housings 66 and 76 employed in the steamer 10, and is mounted directly on the sidewall 194a of the oven chamber housing 194. The inlet housing 220 has an internal steam passage which discharges directly into the oven chamber 193 similar to the discharge orifice 66a of the inlet housing 66. The steam inlet housing 220 is similarly made of a corrosion resistant metallic material having sufficient mass to respond to the temperature of steam entering the oven chamber 193, while being slow to respond to temperature changes within the oven chamber, as when opening the access door 196. A thermostat switch type temperature sensor 222 is mounted on the steam inlet housing 220 and senses the temperature of the inlet housing in response to steam passing from the steam generator into the oven chamber 193. The temperature sensor 222 is operatively coupled to the 500 watt electric heater within the steam generator 206, to maintain the quiescent low fire power input to the steam generator when the steamer on-off switch 202a is "on" but the timer 202d is not set for a cooking mode. In this manner, steam is supplied to the oven chamber 193 to continually replenish heat loss due to convection through the walls of the oven chamber housing and any heat loss from intermittent opening of the access door 196. The temperature within the oven chamber 193 is thus maintained substantially in a "cooking ready" condition at all times as indicated by the ready indicator light 202b. Setting the timer 202d to initiate a cooking cycle or mode results in substantially instantaneous application of steam heat to food products within the oven chamber 193, and also initiates full or high fire power to the steam generator heater to instantaneously increase steam flow to the oven chamber.

In similar fashion to the steam inlet housing 66, the steam inlet housing 220 has a funnel-shaped member (not shown) formed generally peripherally of its steam discharge opening into the oven chamber 193 so as to enable introduction of a cleaning or deliming solution directly into the inlet housing 220. In the embodiment illustrated in FIG. 15, a flow conduit 224 is connected to the steam inlet housing 220 in communication with its internal steam passage. The opposite end of conduit 224 is connected to the lower region of the steam generator 206 below the minimum water level maintained therein. With the flow conduit 224 being inclined upwardly from the steam generator to the steam inlet housing 220, water is maintained within the conduit 224 to a level as indicated at 224a to thereby establish a water trap within conduit 224 which is at a temperature below boiling. The trapped water in conduit 224 prevents steam from entering the steam generator through conduit 224 from the oven chamber. During a cleaning or deliming operation, cleaning or deliming solution can be readily introduced into the steam generator 206 through the steam inlet housing 220 and conduit 224 so as to effect cleaning and/or deliming of the boiler and associated oven compartment. A suitable drain in the bottom of boiler 206 enables draining or blowdown of the boiler.

A fan or blower wheel similar to the fan or blower wheel 44 illustrated in FIG. 6 is supported within oven chamber 193 by a fan or blower drive motor 226 which is mounted on the sidewall 194a of the oven housing 194. Energizing motor 226 effects convection or circulation of steam within the oven chamber during a heating or cooking operation.

Referring to FIG. 16, condensate on the walls of the oven chamber 193 and any drippings from food products during a cooking operation pass through a lower drain line 228 into a discharge drain tube 230. As the condensate and any steam from the oven chamber pass through the drain tube 230, they are impinged by a water spray nozzle 232 which projects into the drain tube to quench and condense the steam for discharge through a discharge end of the drain tube. In the illustrated embodiment, water is supplied to the spray nozzle 232 through a water supply line 232a under the control of a solenoid control valve 234.

Figure 17:
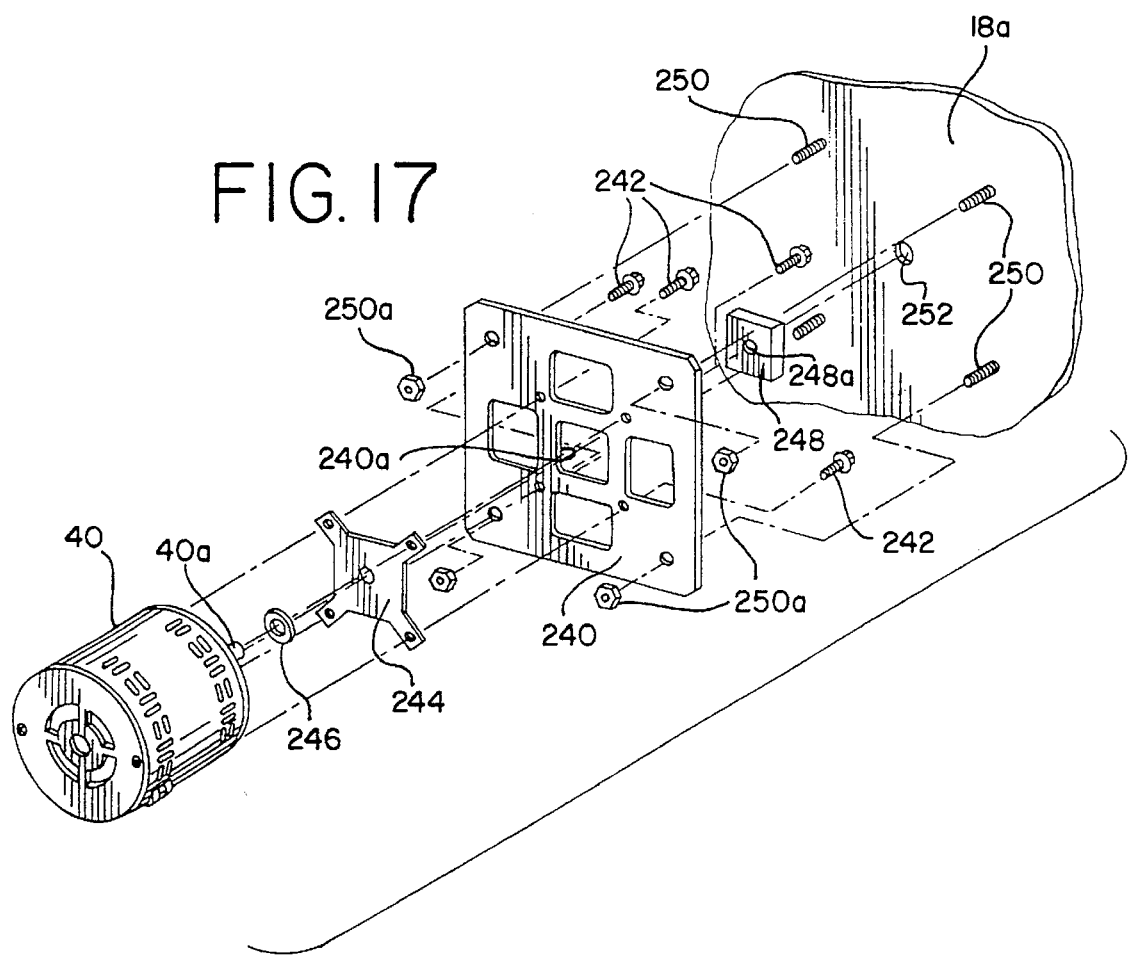
FIG. 17 is an exploded perspective view of a fan drive motor mounting and shaft seal arrangement in accordance with a feature of the present invention.

In accordance with a further feature of the invention, the fan or blower drive motors, such as indicated at 40 and 42 in FIG. 3 and indicated at 226 in FIG. 15, are mounted on vertical sidewalls of the corresponding oven chamber housings through mounting means which includes means to seal about the corresponding motor drive shaft as it passes through the sidewall. The sealing means prevents steam from passing out of the oven chamber through the blower drive shaft openings. Referring to FIG. 17, and with the manner of mounting fan or blower drive motor 40 being representative, the drive motor 40 is mounted on a rectangular motor mounting plate 240 through suitable mounting screws 242. The screws 242 extend through the mounting plate 240 and a seal holder plate 244 and are threaded into suitable threaded bores within the forward end surface of the fan motor 40. A water condensate slinger washer 246 is disposed about the motor drive shaft 40a between the motor housing and the seal holder plate 244. After mounting the fan or blower motor 40 on the mounting plate 240, a generally rectangular seal member 248 is placed over the motor drive shaft 40a so that the drive shaft extends through a close fitting cylindrical opening or bore 248a formed centrally through the seal member. The rectangular seal member 248 is received within a rectangular opening 240a centrally of the motor mounting plate 240 to prevent rotation of the seal member. The seal member 248 is made of a closed cell foam rubber, such as foamed urethane or a closed cell silicone material, that will not absorb water. Forming the cylindrical bore 248a, as by a cutting or die cutting process, creates open cells about the periphery of the bore 248a when cut through the seal member. When assembling the seal member 248 onto the motor drive shaft 40a after mounting the drive motor on the motor mounting plate 240, grease is applied to opposite side surface of the seal member and internally of the cylindrical bore 248a so as to fill the open cells adjacent the bore. In this manner, the open cell structure peripherally of the drive shaft 40a retains grease between the seal member and the outer peripheral surface of the drive shaft 40a. The remaining closed-cell structure of the seal member creates a water seal which prevents water or steam vapor from passing transversely through the seal member.

With the motor 40 mounted on the mounting plate 240 and with the seal member 248 assembled onto the drive shaft 40a, the mounting plate 240 is mounted on the corresponding oven chamber wall 18a through threaded stub shafts or mounting posts 250 and retaining nuts 250a. The motor drive shaft 40a extends through a similar diameter circular opening 252 in the oven wall. The transverse thickness of the seal member 248 is selected so that the seal member is slightly compressed laterally between the seal holder plate 244 and the oven wall 18a. The grease retained within the open cells peripherally of the seal bore 248a provides a gas and liquid tight seal about the motor drive shaft 40a and prevents passage of steam from within the oven chamber through the opening 252 peripherally of the motor drive shaft. The seal also prevents water or steam vapor from entering the atmosphere and from entering the fan motor windings with resultant corrosion or other operating problems. The closed cell pliable resilient nature of the foam rubber shaft seal member 248 provides a relatively soft sponge-like resiliency which has sufficient memory to return to its original shape after compression. Thus, the seal member 248 allows for non-concentric misalignment between the axis of the shaft 40a and the bore 248a of the seal member. Any such non-concentricity causes the seal member to be compressed peripherally of the bore 248a on each rotation of the shaft 40a in a cyclical fashion. The seal member can readily accommodate such compression or displacement without applying significant radial drag force on the shaft, and without losing its sealing relation with the shaft.

It will be appreciated that the closed cell resilient seal member 248 can alternatively be supported within a bearing cage-like retainer having mounting means to enable assembly of the seal member with a shaft but independently of any other components coupled to the shaft, such as a drive motor. It is only necessary that such a support cage expose the seal member peripherally of its bore 248a to accommodate resilient compression of the seal in a direction radially of its bore. It is also necessary that such a mounting or retaining cage prevent rotation of the seal about the axis of the bore 248a. It may also be desirable to compress the foam seal member in its axial dimension to form the bore 248a to a diameter slightly less than the diameter of a shaft with which the seal member is used.

Figure 19C:
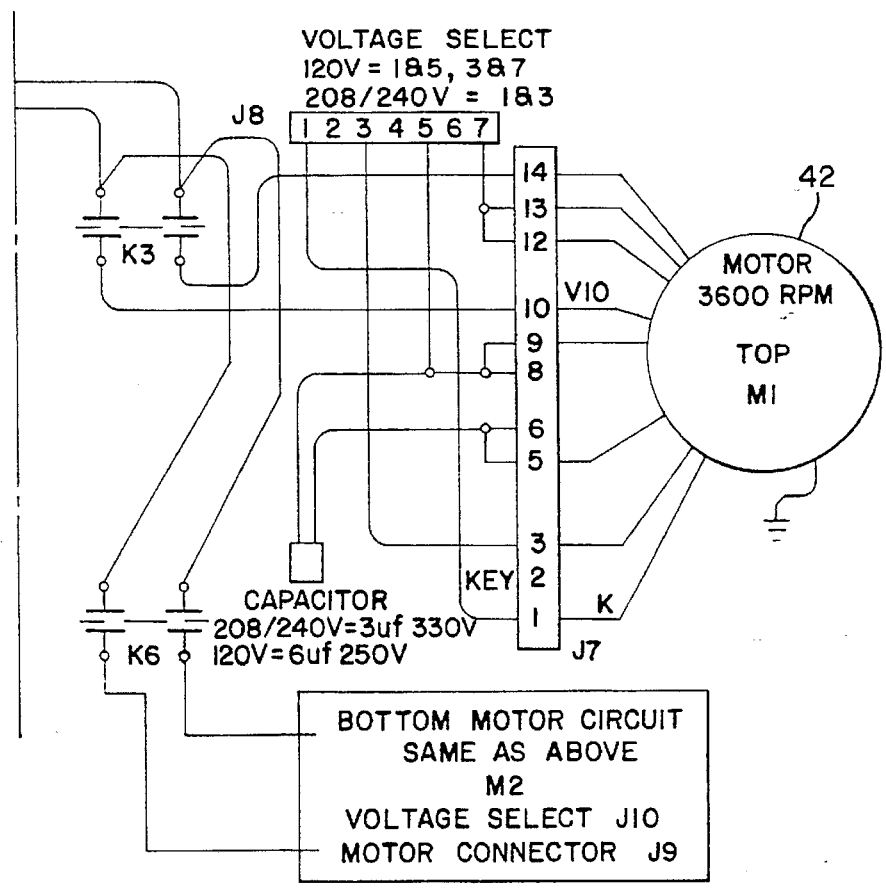
FIGS. 19A–C collectively illustrate a schematic control circuit diagram for use with double oven atmospheric steamers having gas-fired steam generators in accordance with the present invention.
Figure 19A:
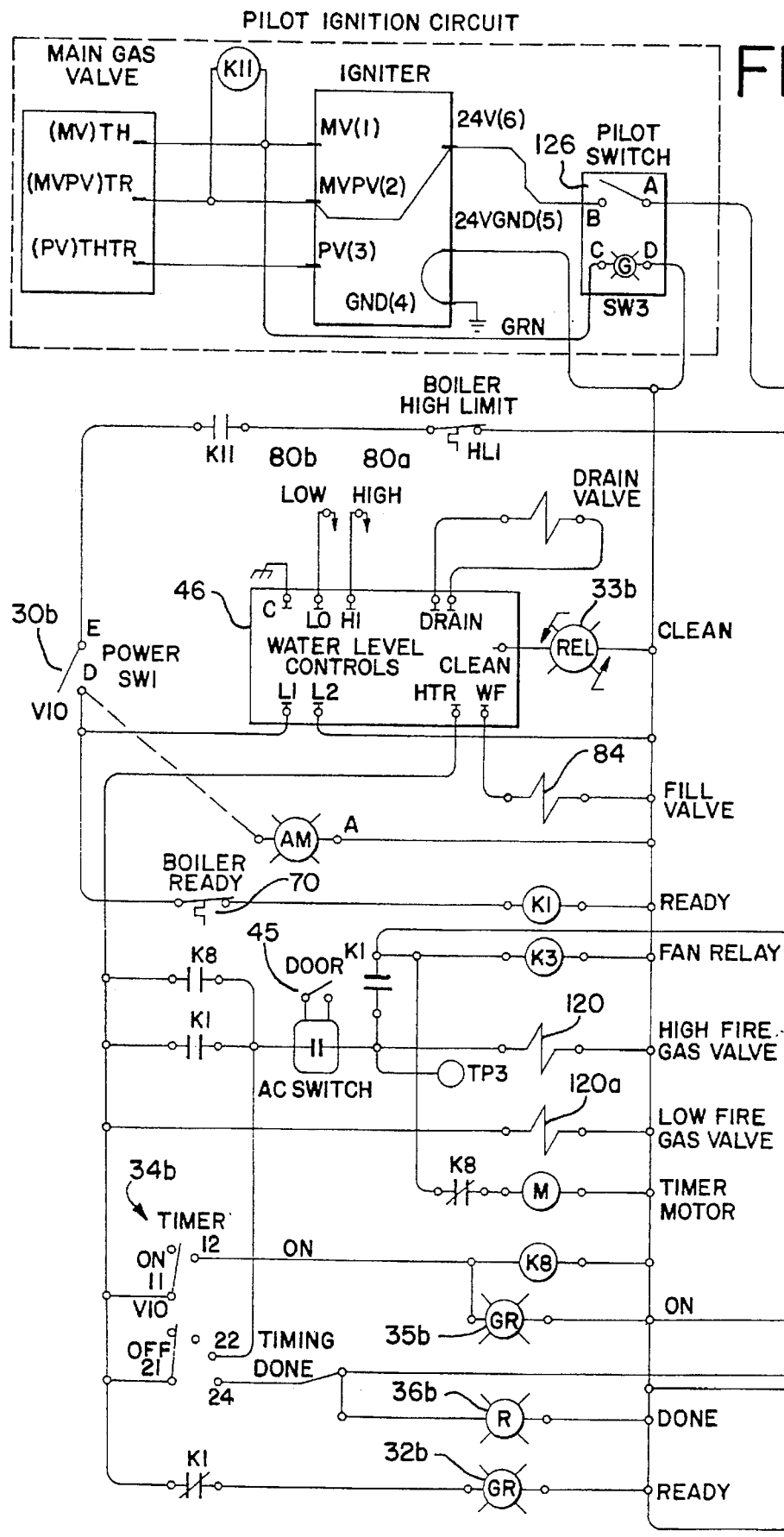
Figure 19B:
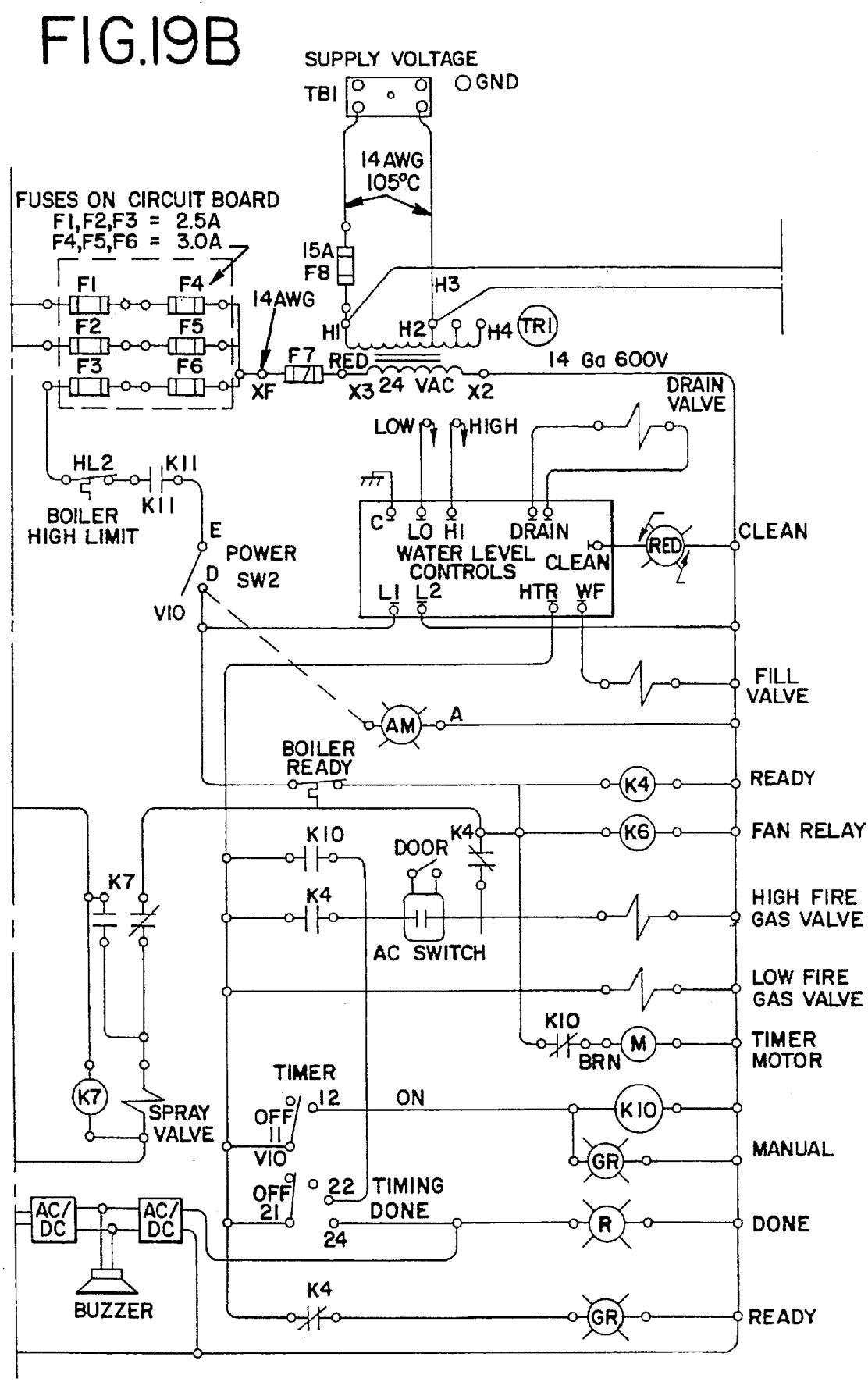

FIG. 19A–C collectively illustrate a schematic circuit diagram showing the control circuit for the gas-fired double oven steamer 10. It is believed that the circuit is self-explanatory and enables one skilled in the art to implement the aforedescribed structural and functional features of the steamer 10. For example, the control circuit for the double oven steamer 10 employs a pilot ignition circuit of standard design having an igniter and pilot switch 126. Relays and associated relay contacts are operative to sequence the various operating modes of the oven chamber 14 and 16 and associated steam generators 54 and 56.

It will be appreciated that with either the double oven chamber steamer apparatus 10 or the single oven chamber steamer apparatus 190 as aforedescribed, placing a food item, or other item to be steam heated, in the oven chamber and setting the oven timer control for a predetermined timed cooking or heating cycle with result in steam cooking or heating for substantially the exact set time period. This is because the oven chambers are maintained in a ready-to-use heated condition at all times after initiating operation of the steamers. In prior steamers, the oven chambers can be either cold or at a substantially lower temperature than the steam cooking temperature prior to each cooking cycle. In this case, the timer setting has to be varied dependent upon the actual temperature within the oven chamber. However, this requires the operator to guess the timer setting necessary to achieve proper cooking. If a temperature sensor is positioned to detect the oven chamber temperature and is coupled to the oven timer so that the timer, termed a compensating timer, begins timing when the temperature within the oven chamber reaches steam cooking temperature, the time it takes to cook or heat the item is actually greater than the timer setting. In accordance with the steamer apparatus of the present invention, the actual cooking or heating time corresponds substantially exactly to the timer setting.

The oven chambers in the steamer apparatus 10 and 190 are maintained in a "ready" state by temperature sensors which sense steam flow to the oven chambers, and thereby sense the temperature within the oven chambers. These temperature sensors maintain a low quiescent power input to the corresponding atmospheric steam generators sufficient to maintain the water in the steam generators at its boiling temperature irrespective of variations in the boiling temperature as might result from different atmospheric conditions in which the steamers are used. When actual cooking is called for, as by setting the oven timer, the power input to the oven is increased to increase the flow rate of steam into the oven chamber. Such dual power operation of the steam generators thus results in substantially immediate cooking of food items within the oven chambers without delay as experienced with prior steamer apparatus.

The use of a discrete atmospheric steam generator for each oven chamber of the double oven steamer apparatus 10, and maintaining each of the steam generators in a quiescent low power mode sufficient to maintain the water in the steam generators at its boiling temperature, particularly in the case of electrically heated steam generators, results in significantly reduced operating costs. By maintaining the steam generators of the present invention at a quiescent power level, the increased power required to obtain desired steam flow takes substantially less time than would be required to both raise the water temperature from a temperature below its boiling temperature, such as 185°–190° F., to its boiling temperature and then provide desired steam flow to the oven chambers.

It will also be appreciated that while the steamer apparatus 10 and 190 have been described as employing atmospheric steam generators to supply steam to the respective oven chambers or cavities, many of the features of the invention may find application with steamers apparatus which utilize pressure boilers. For example, the use of the sensor probe 80a,b and 82a,b on the steam generators 54 and 56 in conjunction with the "clean" indicator lights 33a and 33b in a logic arrangement to provide a visual signal to the operator that the corresponding steam generator needs cleaning could be similarly used with pressure boilers. Also, the use of steam supply lines from the steam generators to the respective oven chambers in a manner enabling convenient introduction of a cleaning or deliming agent into the steam generators from internally of the oven chambers could also find application with steamers employing pressure boilers.

Thus, while preferred embodiments of steamer apparatus in accordance with the present invention have been illustrated and described, it will be understood that changes and modifications may be made therein without departing from the invention in its broader aspects. Various features of the invention are defined in the following claims.

What is claimed is:

1. A steamer apparatus comprising an oven chamber, a steam generator including an internal water chamber and operative to provide steam to the oven chamber, a source of heat for heating water in the water chamber, a pair of sensors exposed within the water chamber in vertically spaced relation, said sensors defining an upper sensor operative to detect when an upper water level has been attained in the water chamber, and a lower sensor operative to effect heat input to the water chamber, said upper and lower sensors being susceptible to liming-over with resulting malfunction, and indicator means responsive to the state of the upper and lower sensors to provide an indication to an operator that one or more of the sensors has limed over whereby to indicate that the steam generator needs cleaning.

2. A steamer apparatus as defined in claim 1 including an upstanding cabinet having said oven chamber therein and having a control panel thereon, said indicator means comprising an indicator light mounted on said control panel to provide a visual indication that one or more of the sensors has limed over.

3. A steamer apparatus as defined in claim 1 wherein said sensors comprise sensor probes normally operative to enable electrical conduction therethrough when covered with water in the water chamber, said sensor probes being responsive to liming-over and resultant malfunction, said indicator means comprising an indicator light, and said sensor probes being cooperative to effect lighting of said indicator light in accordance with a logic analysis of the conductive condition of said sensor probes.

4. Steamer apparatus comprising, in combination, an oven chamber, a steam generator adapted to contain a quantity of water and including a heater for heating water within the steam generator to create steam, a steam inlet housing mounted on a sidewall of said oven chamber and defining a discharge orifice communicating with said oven chamber, and a flow conduit interconnected between said inlet housing and said steam generator, said steam inlet housing having a funnel-shaped member projecting into said oven chamber to facilitate pouring of a cleaning agent into said discharge orifice and directly into said steam generator from internally of said oven chamber.

5. Steamer apparatus as defined in claim 4 wherein said steam inlet housing is positioned generally centrally on said oven sidewall.

6. Steamer apparatus comprising, in combination, an oven chamber, a steam generator adapted to contain a quantity of water and including a heater for heating water within the steam generator to create steam, a steam inlet housing mounted on a sidewall of said oven chamber and defining a discharge orifice communicating with said oven chamber, and conduit means interconnected between said steam inlet housing and said steam generator to enable introduction of a cleaning agent into said steam generator through said discharge orifice from internally of said oven chamber, said steam generator being supported generally adjacent an upstanding sidewall of said oven chamber, and wherein a water level is maintained in said steam generator which is normally above a bottom wall of said oven chamber but below said discharge orifice, said conduit means interconnecting said discharge orifice to said steam generator at a level below said water level so that a cleaning agent introduced into said conduit means through said discharge orifice flows into said steam generator below said water level.

7. Steamer apparatus as defined in claim 6 wherein said conduit means is connected to said steam generator so that water within said steam generator creates a water trap within said conduit means for preventing steam from entering said steam generator through said conduit means.

8. Steamer apparatus as defined in claim 4 including a further discrete conduit connecting said steam generator to said oven chamber for enabling passage of steam from said steam generator into said oven chamber.

9. Steamer apparatus as defined in claim 8 wherein said further conduit is connected to said steam inlet housing so as to enable steam passage into said oven chamber through said discharge orifice.

10. A countertop type steamer apparatus comprising, in combination, an outer cabinet, an oven chamber internally of said cabinet, a steam generator supported within said cabinet for containing a quantity of water and including a heater operative to heat water within the steam generator to create steam, a steam inlet housing mounted on a sidewall of said oven chamber and defining a discharge orifice communicating with said oven chamber, said steam generator being supported so that a minimum water level in said steam generator is normally above a bottom wall of said oven chamber but below said discharge orifice, a first conduit connecting said steam generator to said steam inlet housing for enabling passage of steam from said steam generator to said oven chamber, and a second conduit interconnected between said steam inlet housing and said steam generator at a level below said water level so that a cleaning agent introduced into said second conduit from internally of said oven chamber flows by gravity into said steam generator below said water level.

11. Steamer apparatus as defined in claim 10 wherein said steam inlet housing has a funnel-shaped member projecting into said oven chamber to facilitate pouring of a cleaning agent into said discharge orifice for passage through said second conduit to said steam generator.

12. Steamer apparatus as defined in claim 10 wherein said second conduit is connected to said steam generator so that water within said steam generator creates a water trap preventing steam from entering said steam generator through said second conduit.

\* \* \* \* \*